United States Patent
Olivarez Correa et al.

(10) Patent No.: US 12,061,126 B2
(45) Date of Patent: Aug. 13, 2024

(54) PRESSURE SENSING DEVICE AND METHOD

(71) Applicant: Tangi0 Limited, London (GB)

(72) Inventors: Ilan Johan Eduardo Olivarez Correa, London (GB); Chia-hung Lin, London (GB); Francesca Perona, London (GB); Jose Rodriguez Javaloyes, London (GB); Victor Bellvert Giner, London (GB); Liucheng Guo, London (GB); Ming Kong, London (GB)

(73) Assignee: TANGI0 LIMITED, London (GB)

( * ) Notice: Subject to any disclaimer, the term of this patent is extended or adjusted under 35 U.S.C. 154(b) by 89 days.

(21) Appl. No.: 17/432,262

(22) PCT Filed: Feb. 24, 2020

(86) PCT No.: PCT/GB2020/050436
§ 371 (c)(1),
(2) Date: Aug. 19, 2021

(87) PCT Pub. No.: WO2020/169993
PCT Pub. Date: Aug. 27, 2020

(65) Prior Publication Data
US 2022/0252470 A1    Aug. 11, 2022

(30) Foreign Application Priority Data
Feb. 22, 2019 (GB) .................................... 1902477

(51) Int. Cl.
*G01L 1/14* (2006.01)
*G01L 9/00* (2006.01)
(Continued)

(52) U.S. Cl.
CPC ............ *G01L 1/146* (2013.01); *G01L 9/0005* (2013.01); *G06F 3/04144* (2019.05); *G06F 3/0445* (2019.05); *G06F 3/0447* (2019.05)

(58) Field of Classification Search
CPC ..... G01L 1/146; G01L 9/0005; G01L 9/0072; G01L 9/12; G06F 3/04144; G06F 3/0445; (Continued)

(56) References Cited

U.S. PATENT DOCUMENTS

2011/0096025 A1    4/2011  Slobodin et al.
2012/0323501 A1*  12/2012  Sarrafzadeh ............. G01L 1/18
                                                    702/41

(Continued)

FOREIGN PATENT DOCUMENTS

GB    2564929 A        1/2019
WO    2020/169993 A1   8/2020

OTHER PUBLICATIONS

International Search Report and Written Opinion issued in related Application Serial No. PCT/GB2020/050436 on Issue Date; Jul. 23, 2020.
(Continued)

*Primary Examiner* — Patrick N Edouard
*Assistant Examiner* — Joseph P Fox
(74) *Attorney, Agent, or Firm* — Brian J. Colandreo; Jeffrey T. Placker; Holland & Knight LLP

(57) ABSTRACT

A pressure sensing device (1000) comprises first and second electrodes (10, 20) spaced from each other by a distance. At least one of the electrodes is formed of/comprises a unitary piece of non-metallic conductive material. The distance is changeable in response to a pressure/force applied to the first and/or second electrode. The device comprises a measurement module (500) connected to the first/second electrode at a plurality of sensing points (S1 . . . ). The measurement (Continued)

module is configured to measure a change in capacitance between the first and second electrodes, in response to a change in the distance when a pressure/force is applied to the first and/or second electrode, at each sensing point individually and/or at all sensing points simultaneously. The measurement module is configured to determine the location, area and amount of applied pressure on the first and/or second electrode from the individual measurements, and/or the amount of the applied pressure from the simultaneous measurement.

12 Claims, 20 Drawing Sheets

(51) Int. Cl.
*G06F 3/041* (2006.01)
*G06F 3/044* (2006.01)

(58) Field of Classification Search
CPC ............... G06F 3/0447; G06F 3/04166; G06F 2203/04103; G06F 2203/04107; A61B 5/1038

See application file for complete search history.

(56) References Cited

U.S. PATENT DOCUMENTS

| | | | |
|---|---|---|---|
| 2013/0278535 A1* | 10/2013 | Kim | G06F 3/044 |
| | | | 345/173 |
| 2014/0174205 A1* | 6/2014 | Clarke | A61B 5/1038 |
| | | | 73/862.626 |
| 2016/0370899 A1 | 12/2016 | Chang et al. | |
| 2017/0176266 A1 | 6/2017 | Mathieu et al. | |
| 2017/0177141 A1 | 6/2017 | Shih et al. | |
| 2017/0242506 A1* | 8/2017 | Patel | G06F 3/041 |
| 2020/0174625 A1 | 6/2020 | Lin et al. | |
| 2021/0181049 A1* | 6/2021 | Kwak | G01L 1/205 |

OTHER PUBLICATIONS

European Examination Report issued in Application Serial No. 20708594.5 on Mar. 19, 2024.

* cited by examiner (a)

(b)

(c)

(a)

(b)

(c)

(d)

(a)

(b)

(c)

PRESSURE SENSING DEVICE AND METHOD

CROSS-REFERENCE TO RELATED APPLICATIONS

The subject application is a U.S. National Stage application of International Application No. PCT/GB2020/050436, filed on 24 Feb. 2020, which claims the benefit of Great Britain Patent Application No. 1902477.7, filed on 22 Feb. 2019. The contents of which are herein incorporated by reference in their entirety.

TECHNICAL FIELD

This invention relates generally to pressure sensing devices, particularly, but not exclusively, to devices for determining the location, area and amount of pressure exerted by human touch, the human body or an object on a surface of the device. The invention also relates to a method of operating and manufacturing the device.

BACKGROUND TO THE INVENTION

There is an increasing need for embedding touch-sensitive and/or pressure-sensitive devices and functions into conventionally passive objects and surfaces. Developments in this area are helping human-machine interactions become seamless with everyday life. They are also playing an important role in acquiring new knowledge in academic areas, collecting useful research data, and driving businesses to discover new insights of consumer behaviour.

A growing area of interest is the ability to continuously monitor, through novel sensing devices, the varying pressure exerted by various parts of the human body on objects that a user naturally interacts with on a daily basis. This can be used to actuate parts of a system in response to a detected behaviour and/or gather data that can later be analysed to provide useful feedback to an end user. In particular, foot pressure monitoring has found applications in multiple areas, including biomedical diagnostics, prevention of foot ulcerations (e.g. in a diabetic person's foot), physical rehabilitation, sports performance training, injury prevention, and electronic games. By determining the distribution of static and dynamic pressure forces exerted by a person's body through their foot on a shoe sole, one can determine and improve balance, detect excessive pressure in specific areas of the foot, analyse gait stability, detect mobility patterns to understand a user's behaviours and actions, and monitor posture. Similarly, monitoring pressure exerted by a person's body on a seat has applications in the automotive industry, e.g. to monitor a user's comfort, posture and overall behaviour while driving. Seat design is fundamental to preventing issues related to bad sitting posture, and gathering data about sitting behaviour through pressure maps can help manufacturers to improve seat design and comfort and driver's safety. In addition, pressure mapping opens up possibilities of detecting different driving conditions and providing active feedback to the user.

These emerging applications present new challenges in the design and fabrication of pressure mapping devices due to the need of flexible and durable devices capable of naturally following movements of users during daily activities, and simple cost effective ways to obtain high resolution measurements.

Common solutions for producing accurate pressure maps of the foot, such as those described in EP3235428A1 and U.S. Pat. No. 5,323,650A, implement flexible XY sensor array configurations comprising multiple discrete force/pressure sensors. These solutions utilise multiple layers with a large number of electrical components, interconnects/traces and fabrication steps. The individual sensors that make up the XY sensor array are typically split between multiple sensing layers (e.g. one for X positions and one for Y positions) that require assembly and overlay, and each layer of the device typically requires different conductive/non-conductive materials and properties, coatings (e.g. pressure-sensitive coatings), printed conductive tracks/traces and fabrication techniques/steps. As such, these sensor array solutions inherently present complications for device fabrication. In addition, the logic behind array sensing systems is based on the miniaturisation and multiplication of the sensing points, adjusted in two separate directions designed to intersect to provide XY resolution. This approach presents design limitations, particularly upon increasing the spatial resolution as the conductive traces need to be narrowly fitted into the available spaces with limited margin for error, as shown in U.S. Pat. No. 5,323,650A.

Similarly, solutions developed for seat pressure mapping have used a plurality of printed conductive traces ending in sensing points on a sensing layer to measure localised pressure and forces. For example, CN1882460A discloses an apparatus for detecting seat occupancy based on measuring pressure-induced changes in resistance of a sensing layer composed of multiple layers of resistive and conductive materials and coatings. Pressure location is determined by measuring resistance changes between pairs of sensing points on opposing sides of the sensing layer. Therefore, a considerable amount of resistive material, sensing points and printed traces are needed to achieve high-resolution pressure mapping, which in turn increases device complexity and fabrication/material costs.

In wearable device and/or seating/bedding applications where surfaces are subject to constant and repeated movements and stresses, devices incorporating complicated sensor arrays, conventional printed traces and/or coatings may be prone to deterioration through breakage and/or de-lamination which may ultimately limit the commercialisation in industries such as consumer electronics, wearable and healthcare products and automotive interiors.

To achieve mass-production of such pressure mapping devices, there is therefore a need for greatly simplified sensing systems that provide high-resolution pressure mapping with minimal sensor elements, and can be produced with affordable materials and fabrication processes.

Aspects and embodiments of the present invention have been devised with the foregoing in mind.

SUMMARY OF THE INVENTION

According to a first aspect of the invention, there is provided a pressure sensing device. The device comprises a first electrode and a second electrode. The first and second electrodes may be spaced apart and/or separated from each other. The first and second electrodes may be spaced apart and/or separated from each other by a distance. The first electrode and/or the second electrode may be formed of or comprise a non-metallic conductive material. The first electrode and/or the second electrode may be formed of or comprise a unitary piece of non-metallic conductive material. The first electrode and/or the second electrode may be formed of or comprise a moveable and/or deformable and/or flexible non-metallic conductive material (e.g. conductive plastics, foams, and/or rubbers, etc.), such that the distance is changeable in response to a pressure or force applied to or on the first and/or second electrode (at one or more locations). The change in distance may be uniform or non-uniform. The term "non-metallic" conductive material used here and throughout means a material that is not a metal such as gold, silver or aluminium. The device may further comprise a measurement module. The measurement module may be connected or connectable to the first and/or second electrode at one or more sensing points (or a plurality of sensing points) on said electrode. The measurement module may be configured to measure, at one or more of the sensing points, a change in an electrical signal in response to a pressure or force applied on or to the first and/or second electrode, e.g. that changes or reduces the distance (e.g. in one or more locations). The electrical signal may be or comprise a change in capacitance between the first and second electrode. The measurement module may be configured to measure the change in capacitance at each sensing point individually, and/or at all sensing points simultaneously. The measurement module may be configured to determine the location, area and/or amount of the applied pressure on the first and/or second electrode from the individual measurements. The measurement module may be configured to determine the amount of applied pressure from the simultaneous measurement. The amount of applied pressure may be a relative value or an actual pressure value.

The space between the first and second electrode may be at least partially filled or occupied by a non-conductive, compressible and/or flexible spacer layer or material. Alternatively, the distance between the first electrode and second electrodes may be or comprise one or more gaps. The gap(s) may span the distance. The gap may be or comprise an air gap, empty space or a void. The first and second electrodes may be spaced apart and/or separated from each other by one or more gaps. The gap(s) may be changeable and/or closable in response to a pressure or force applied to the first and/or second electrode. The measurement module may be configured to measure, at one or more of the sensing points, a change in an electrical signal in response to a pressure or force applied on or to the first and/or second electrode, e.g. that changes, reduces or closes one or more of the gaps.

The device uses one or more non-metallic conductive electrodes to achieve pressure sensing without traditional metallic electrode sensors. The use of non-metallic conductive materials for the first and/or second electrodes has a number of advantages over conventional sensing technologies using sensors with metal electrodes. The material cost and weight is significantly lower than that of conventional metal electrode materials (such as a gold, silver or aluminium). The non-metallic conductive materials may be mouldable. Therefore, manufacture/assembly of the sensor device is simplified and the associated manufacture/assembly cost is reduced. In addition, the first and/or second electrodes can be formed and/or moulded into almost any arbitrary size, shape or three-dimensional (3D) form due to the nature of the moulding process. This has a number of practical and functional advantages:

- The electrode(s) can be unitary pieces of material that can provide XY resolution pressure sensing without the need for multiple discrete pressure/force sensors, thus greatly simplifying the construction and operation of the device.
- The electrode(s) may be formed from or comprise recyclable materials.
- The electrode(s) may conform to arbitrary surfaces and shapes regardless of the complexity of the surface/shape. This may eliminate the need for flexible printed circuits which can introduce complexity in the electrode arrangement, wiring, and increase wear and tear and assembly costs.
- The electrode(s) have a 3D volume and can cover larger areas enabling them to be much more sensitive to capacitance changes and produce larger signal changes compared to their typically smaller metal electrode counterparts.
- The electrode(s) can be formed of or comprise the same or a similar material in replacement of the material of the original product. For instance, a non-pressure-sensitive foam shoe sole insert can be turned into a pressure-sensitive insert by replacing its non-conductive foam with conductive foam, so that the sensor electrode material offers same physical and/or ergonomic functions as the original product material, making the electrodes easy to integrate for manufacturers.
- Where present, the dimensions of the gap(s) can be chosen to tailor the pressure response. For example, for a given electrode material and dimensions, the depth and width of the gap(s) can be configured to set a predetermined pressure or force required to reduce and/or close the gap(s) and produce a change in capacitance. This allows the pressure sensitivity and/or dynamic range of the device to be controlled through design.

Overall, the design freedom for the sensor device itself is significantly increased.

As such, in use, a pressure or force applied directly or indirectly to the first and/or second electrode that causes the first and/or second electrode to deform and change/reduce the distance/gap between them causes a change in capacitance that can be measured by the measurement module at the sensing points (individually and/or simultaneously). Based on the position of each sensing points on the first and/or second electrode and the magnitude of the signal measured at each respective sensing point, the location, area and/or amount of the applied pressure/force can be determined.

The device may be used for a number of pressure sensing applications including, but not limited to, seating and shoe-sole pressure-sensing. Conventional seating and shoe-sole pressure-sensing devices rely on metal electrode materials and metal-based electronic devices and therefore require additional electronic components in order to incorporate pressure-sensing functions to a traditionally non-sensor object (e.g. a shoe sole). Conventional sensor approaches do not take advantage of the object/products' innate materials, such as polyurethane (PU) foam, ethylene vinyl acetate (EVA) and rubber, as the sensor electrode itself. Manufacturers and technology adopters are therefore required to implement additional assembly processes which can be foreign to their original manufacturing processes bringing higher risks and costs.

The determined location of the applied pressure or force may be or comprise a single point or coordinate. The determined area of the applied pressure or force may be or comprise a spatial extent and/or shape of the applied pressure profile. The area may have location. For example, a pressure or force may be applied at a given location over a large area or a small area. The location of the area may be may correspond to the centre of the area. The amount of applied pressure or force may be or comprise a value positively related to the magnitude of the applied pressure or force. The amount of applied pressure or force may be a qualitative value (e.g. a normalised or relative value) or a quantitative value (e.g. an actual pressure or force value).

Where quantitative data is required, the device may be calibrated using known values of applied pressure or force such that the capacitance measurements can be converted to a pressure or force value using a pre-determined relationship.

Where there are multiple locations/areas, an area and/or a distribution of the applied pressure or force, the measurement module may be configured to determine a plurality of locations, areas and/or amounts of the applied pressure and map the pressure distribution. In this way, the device may be or comprise a pressure mapping device.

The measurement module may be configured to map each measurement obtained from an individual sensing point to a distance or proximity of the applied pressure/force from said individual sensing point. The measurement module may be configured to determine the location (e.g. XY or absolute) of the applied pressure on the device from the mapped distances. The measurement module may be configured to determine the area or shape of the applied pressure on the device from the mapped distances. For example, the mapped distances may correspond to the locations of the boundary of the area. The location of the area can then be determined from the boundary locations. With knowledge of the relative location of each sensing point on the first and/or second electrode, this information can be used to build up a pressure area profile.

The first and/or the second electrode may be formed of or comprise a non-metallic conductive thermoformable material, and/or may be formed by a moulding process.

Suitable materials for the first and/or second electrode(s) may include but are not limited to conductive plastics, conductive rubbers, conductive polymer materials and conductive foams, such as conductive acrylonitrile butadiene styrene (ABS) or conductive PU, conductive EVA, conductive thermoplastic elastomer (TPE) and conductive thermoplastic polyurethane (TPU). Such materials may be formed by an injection-moulding, heat-pressing, heat-lamination or thermo-forming process. Alternatively, such materials may be formed by 3D printing, computer numerical control (CNC) machining/milling, laser or water jet cutting (e.g. of uniform sheets of material). Such materials may be made to be substantially rigid or pliable and/or deformable.

The first electrode and the second electrode may be formed of or comprise the same material or different materials. The first and/or second electrodes may have a uniform thickness or a non-uniform thickness. The thickness of the first electrode and the second electrode may be the same or different.

The sensing point(s) may be positioned at or near a periphery or a peripheral edge of the first and/or second electrode. The sensing point(s) may be distributed around or about the periphery or peripheral edge of the first or second electrode. The sensing point(s) may be distributed evenly or unevenly around the periphery/peripheral edge of the first and/or second electrode.

The second electrode may be arranged over, under, on top of, beneath, above or below, the first electrode. The device may be configured such that the first electrode and second electrode are permanently separated from each other in some areas such that they cannot contact each other, and not in others.

The electrode (i.e. the first or the second electrode) with the sensing point(s) may be referred to as a sense electrode. The other electrode (i.e. the second or the first electrode, respectively) may be referred to as a reference or ground electrode. The reference electrode may be connected to the measurement module at one or more reference or ground points on the reference electrode. The reference electrode may be electrically grounded (e.g. by connection to ground/reference terminal of the measurement module). The first electrode and the second electrode may together form a pressure sensing layer.

Each sensing point may be selectively connectable to the measurement module by a conductive trace or track. The conductive trace/track may be or comprise a wire, a conductive thread or a printed/deposited conductive trace/track on a substrate (e.g. thin flexible substrate or PCB).

The measurement module may be or comprise a sensing circuit configured to measure changes in capacitance, e.g. at the sensing points connected to the sensing circuit. The sensing circuit may be or comprise a capacitive sensing chip with one or more sensing or input channels, such as a capacitive sensing micro-processor or micro-controller. The capacitive sensing chip may be configured to measure changes in the capacitance of the sense electrode via each sensing point connected to its input pin(s). The capacitance measurement may be based on self-capacitance of the sense electrode. The capacitance measurement may optionally be a frequency-based measurement. A change in the separation between the first and second electrode (e.g. via a change in the distance/gap(s)) affects the capacitive coupling between the first and second electrodes which in turn produces a change in the measured capacitance.

Each sensing point may be connectable to the sensing circuit at the same sensing input pin of the sensing circuit. This minimises the quantity of sensing channels needed from a capacitive sensing chip. Such capacitive sensing chips are low cost. Alternatively, two or more sensing points (or each sensing point) may be connectable to the sensing circuit at a different sensing input pin of the sensing circuit.

The measurement module may further comprise a switching unit connected between the sensing circuit and the sensing points. The switching unit may be configured to selectively connect and/or disconnect each sensing point to/from the sensing circuit. The switching unit may comprise one or more switching elements, such as transistors (e.g. general purpose, PNP and/or NPN transistors), relays and/or any other controllable switching elements known in the art. Each sensing point may be connected or connectable to the/an input pin of the sensing circuit via a switching element. The switching unit thus enables the sensing circuit to obtain measurements or readings from each sensing point individually (i.e. scan through the sensing points), all sensing points simultaneously, and/or any combination of sensing points simultaneously, by selectively connecting/disconnecting each sensing point from a (single) input pin. For example, when obtaining a measurement from an individual sensing point, the sensing circuit may be configured to connect that sensing point to the input pin and disconnect all other sensing points from the input pin(s). This may ensure the circuitry is not shorted when determining a location, area and/or amount of the applied pressure from an individual sensing point.

The measurement module may further comprise a control unit connected to the switching unit to control the connecting and/or disconnecting of each sensing point. The control unit may be configured to provide one or more control signals to the switching elements of the switching circuit to control their operation. The control unit may be configured to control the timing and/or frequency of the switching.

The measurement module may be configured to operate in a first mode and/or a second mode. In the first mode, the switching unit may scan through each sensing point (i.e. selectively connect each individual sensing point to the sensing circuit one by one), such that the sensing circuit can obtain a measurement or reading from each individual sensing point separately. In the first mode, only one sensing point is actively connected to the sensing circuit at a given time. For example, while a measurement or reading is being taken from one sensing point, other (non-active) sensing points may be disconnected from the sensing circuit. The scan or switching frequency may be sufficiently high compared to a typical movement of the body to minimise any measurement lag, e.g. such that the measurement/detection may be perceived to be in real-time. For example, the scan rate may be in the range 100-200 Hz. The scan or switch rate may be slower or faster depending on the application.

In the second mode, the switching unit may connect each sensing point to the sensing circuit simultaneously, such that the sensing circuit can obtain a measurement or reading of capacitance from each sensing point simultaneously. In this way, each sensing point contributes to the measurement or reading in the second mode.

The first mode may provide information on the location, area and/or the amount of the applied pressure. The second mode may provide information on the (total) amount of applied pressure. Measurements in the second mode can be taken before or after the measurements in the first mode. The measurement module may be configured to periodically and/or continuously switch/alternate between the first and second modes of operation during operation of the device. The first and second modes may be controlled by the control unit.

For a given electrode conductivity, the measured change in capacitance at a sensing point is dependent on the change/reduction in the distance between the first and second electrodes, or the one or more gaps, due to an amount of applied pressure, the distance/proximity of the applied pressure (or location of the altered distance/gap(s)) from the sensing point, and the area over which the pressure is applied. Therefore, for a fixed location and area of applied pressure the measurement provides a value positively related to the amount of the applied pressure, for a fixed amount and area of applied pressure the measurement provides a value positively related to the distance or proximity of the location of the applied pressure from the sensing point, and for a fixed amount and location of applied pressure the measurement provides a value positively related to the area of the applied pressure. Where a pressure is applied over an area, the measurement provides information on the relative location of the boundary of the area relative to the sensing point. As such, a measurement from an individual sensing point contains information on the location, area and/or amount of applied pressure. By taking measurements from multiple individual sensing points distributed over and/or around the periphery of the sense electrode, the location, area and/or amount of applied pressure can be determined (the first mode). This information can be used to build up a pressure area profile.

A measurement obtained from all sensing points simultaneously (in the second mode) provides a value positively related to the amount of the applied pressure. This (second mode) measurement can be used in conjunction with the (first mode) measurements from individual sensing points to improve the reliability of the determined location, area and/or amount of applied pressure. For example, the (second mode) simultaneous measurement may be used to confirm whether the applied pressure corresponds to a small amount of pressure distributed over a large area, or a large amount of pressure distributed over a small area. In other words, the (second mode) simultaneous measurement can be used to infer the correct cause of the values obtained from the (first mode) individual measurements and/or find a unique solution to the location, area and amount of applied pressure.

The first mode of operation (i.e. the scanning mode) is driven by the need of taking multiple measurements on the same unitary piece of electrode to minimise engineering complexity. By scanning through multiple individual sensing points (in the first mode), a separate measurement is taken from each different peripheral location in a short (ignorable) span of time, which collectively builds up a pressure area profile and informs the amount of pressure exerted in each area without modulating the material to prevent short-circuit. This can save significant manufacturing costs compared to conventional sensing technologies comprising a plurality of discrete sensor electrodes, where each electrode is only responsible for a small local area and a considerable amount of electrode modules (i.e. sensing elements) is needed to cover a large sensing surface, such as a seat.

The device may comprise a plurality of sense electrodes that share the same reference electrode. Each sense electrode may be connected to the measurement module. Alternatively, the device may comprise a plurality of sense electrodes and a plurality of corresponding reference electrodes. In that case, each sense electrode may be connected to the sensing circuit (e.g. to the same input pin) via the switching circuit. Each reference electrode may be connected to the same reference or ground terminal on the measurement module. In either case, the measurement module may be configured to obtain a pressure area profile from each sense electrode. These may be combined to build the overall pressure area profile for the device. A plurality of sense electrodes may be used to satisfy spatial resolution and/or mechanical requirements in a product. For example, in a shoe-sole application, the device with a plurality of sense electrodes may improve the spatial resolution of the overall combined pressure area profile.

The or each portion of the device in which the first and second electrodes are spaced apart or separated by a gap may form or provide a gapped portion or region. The device may comprise one or more gapped portions or regions in which the first and second electrodes are spaced apart and/or separated by a gap. The first and second electrodes may be configured to approach and/or contact each other in each gapped portion/region in response to a pressure or force applied to or on the or each respective gapped portion/region that changes/reduces or closes the respective gap.

Each of the first electrode and the second electrode may comprise an inner surface and an outer surface. The inner surfaces of the first electrode and the second electrode may face each other. In the or each gapped portion/region, the inner surfaces of the first and second electrodes may be separated by said gap. The gap(s) may extend substantially between the inner surfaces of the first and second electrodes in the gaped portion(s). The or each gap may comprise a width and a height.

The device may further comprise one or more separating elements configured to separate the first electrode from the second electrode, e.g. by the distance. The one or more separating elements may further be configured to provide, form and/or define the one or more gaps or gapped portions/regions. The width and height of the gap(s) may be defined by the separation element(s).

The first electrode or the second electrode may be supported or suspended over/above the other by the one or more separating elements. The separating element(s) may provide one or more support portions or regions adjacent to and/or extending between the gapped region(s). The separation element(s) may be configured to maintain a separation between the first and second electrode and/or the inner surfaces of the first and second electrodes. The separation element(s) may extend between the first and second electrodes and/or may extend from either or both of the first and second electrodes. The separation element(s) may be integrally formed with the first and/or second electrode. Alternatively or additionally, the separation element(s) may be separate to/from the first and/or second electrode.

The separation element(s) may be formed of or comprise a substantially rigid/non-compressible material or a substantially flexible/compressible material. In the latter case, the gap(s) may be reduced and/or closed by a pressure applied directly over the gap(s) or gapped portion/region(s) and/or by a pressure applied over the support region(s) (i.e. not directly over the gap(s)).

In one embodiment, the or each separation element is or comprises a non-conductive separation or spacer layer. The spacer layer may be sandwiched between the first and second electrodes to separate or maintain a separation between the first and second electrodes and/or the inner surfaces of the first and second electrodes. The first electrode and/or the second electrode may be supported by the spacer layer. The spacer layer may be a unitary piece of material.

The spacer layer may comprise one or more through-holes, openings or cut-outs. The one or more through-holes, openings or cut-outs may form, define or provide the gap(s) or gapped portion/region(s). The portions or regions of the spacer layer adjacent to and/or extending between the through-holes, openings or cut-outs may define the support region(s). The spacer layer may comprise an array of such through-holes or openings. The thickness of the spacer layer may define the size/height of the gap. The width of the/each through-hole or opening may define the width of the gap or gapped portion/region. The first electrode and the second electrode may extend across the width of the or each through-hole, opening or cut-out.

The or each through-hole or opening may extend through the thickness of the spacer layer. The or each through-hole or opening may comprise a circular, square, rectangular, polygon or an arbitrary shaped cross-section. Each through-hole or opening may be the same or different shape and/or size. The through-hole(s) or opening(s) may comprise one or more holes, hollows, and/or repeating geometric patterns/tracks. Alternatively, one or more openings may extend partially through the thickness of the spacer layer. For example, one or more openings may be or comprise a recess or thickness variation of the spacer layer.

The spacer layer may comprise the conductive traces or tracks connecting each sensing point to the measurement module and/or sensing circuit.

The spacer layer may be substantially flexible, deformable and/or compressible. The spacer layer may be formed of or comprise a thermoformable non-conductive material and/or may be formed by a moulding process. Suitable materials for the spacer layer may include but are not limited to non-conductive plastics, non-conductive polymer materials and non-conductive foams, such as non-conductive acrylonitrile butadiene styrene (ABS), polyurethane (PU), polycarbonate (PC), polyvinyl chloride (PVC), ethylene vinyl acetate (EVA), thermoplastic elastomer (TPE), thermoplastic polyurethane (TPU) and silicone rubber. Such materials may be made to be substantially rigid or pliable and/or deformable and may undergo an injection-moulding, heat-pressing, heat-lamination or thermo-forming process. Alternatively, such materials may be formed by 3D printing, computer numerical control (CNC) machining/milling, laser or water jet cutting (e.g. of uniform sheets of material). Alternatively, the spacer layer may be formed from or comprise a fabric, paper or latex. The spacer layer may have a similar or higher elasticity and/or flexibility to the first and second electrodes.

In some cases it may be advantageous to eliminate the need for a separate separation/spacer layer (made of a different material) to further minimise assembly cost and complexity. The spacer layer may be integral with the first and/or second electrode. The first and/or second electrode being mouldable allows them to be formed into customisable 3D structures where natural overhangs and/or projections can be formed and used as integral spacers.

For example, in an alternative embodiment, the one or more separation elements may be or comprise one or more projections extending from (an inner surface of) the first and/or second electrodes. The one or more separation elements may be or comprise an array of such projections. The projection(s) may be configured to serve as spacers. The spacer(s) may be configured to maintain the first and second electrodes in the spaced apart relationship. The spacer(s) may be integrally formed with the first and/or second electrode to form a monolithic structure. The spacers may have a proximal end attached to the inner surface of the respective one of the first or second electrode and a distal end.

The gap(s) or gapped portion/region(s) may be formed, provided or defined between the spacer(s) and/or in the region(s) adjacent to the spacer(s). The one or more gaps (of the or each gapped portion) or the or each gapped portion/region may extend substantially in the region around, either side of and/or between the one or more projections/spacers. In other words, the gap(s) or the gapped portion(s) may be defined either side of and/or between the one or more projections/spacers.

The spacer(s) may extend away from the inner surface of the first and/or second electrode to a distance defined by their length. The size/height of the gap (i.e. in the thickness direction) may be determined at least in part by the length of the or each projection/spacer. The width of the gap(s) may be determined by the geometry/design of the projection(s)/spacer(s), e.g. the separation between adjacent projections/spacers.

The spacers may be formed of or comprise the same or different material to the first and/or second electrode. The spacers may have the same or different electrical, thermal and/or mechanical properties as the first and/or second electrode. This can be achieved by forming the spacers in the same (single) moulding step as the first and/or second electrode, or by using a two-step over-moulding process.

The distal end of the or each spacer may contact (the inner surface of) the other of the first and second electrode. In this case, the spacer(s) may support the respective one or the first and second electrodes against the other of the first and second electrodes, or the other of the first and second electrodes may be supported by the spacer(s) (depending on the orientation of the device). Either or both of the first and second electrodes may comprise one or more projections to serve as spacers.

Alternatively, the spacer(s) may not contact the other of the first and second electrode. In one embodiment, the other of the first and second electrode may comprise one or more corresponding through-holes, openings or cut-outs configured to receive a portion of the spacer(s), such that the spacer(s) do not contact the other of the first and second electrode. In another embodiment, the first and second electrodes may be dimensioned such that the spacers are located outside the periphery of the other of the first and second electrodes, such that the spacer(s) do not contact the other of the first and second electrode.

The length of the spacer(s) (or distance to which the spacer(s) extend away from the inner surface of the first/second electrode) may be greater than the depth of the through-hole(s) or opening(s) (or thickness of the electrode comprising the through-hole(s) or opening(s)). In this way, the electrode comprising the spacer(s) is separated from the electrode comprising the through-hole(s) or opening(s) in the thickness direction by the gap (where the length of the spacer(s) is in the same direction of the holes). The spacer(s) may be configured to fit within the through-hole(s) or opening(s) without contacting the sides of the through-hole(s) or opening(s). The size/height of the gap (i.e. in the thickness direction) may further be determined at least in part by the depth of the through-hole(s) or opening(s), or the thickness of the electrode comprising the through-hole(s) or opening(s).

The spacer(s) may be configured to minimise the foot-print of the distal end. In this way, where the distal end contacts the other of the first and second electrode, the electrical contact between the two electrodes is minimised such that the capacitance measurement is not compromised. The spacer(s) may comprise a sidewall connecting the proximal and distal ends. The sidewall may extend in a direction substantially perpendicular to the inner surface of the respective one of the first and second electrode. Alternatively, the sidewall may be angled with respect to the inner surface of the respective one of the first and second electrode, such that spacer(s) is/are substantially pointed and/or the distal end of the spacer(s) has/have a smaller foot-print or cross-sectional area than the proximal end. This may reduce the foot-print of the distal end. In addition, where the spacer(s) is/are angled, the footprint or contact area between the distal end and the other of the first and second electrodes may increase with an applied pressure due to compression of the spacer(s) and/or electrodes. This may provide a change in capacitance that adds to/combines with the change resulting from the reduced gap to enhance the overall magnitude of the measured change in capacitance.

The projection(s) or spacer(s) may be formed of or comprise the same material as the first and/or second electrode comprising the projection(s)/spacer(s). The projection(s) may be integrally formed with the first and/or second electrode comprising the projection(s), e.g. formed in the same moulding step.

Alternatively, the projection(s)/spacer(s) may be formed of or comprise a different material and/or have different material properties (e.g. electrical conductivity and/or mechanical properties) to the material of the first and/or second electrode comprising the projection(s)/spacer(s). In this way, the projection(s)/spacer(s) may have a different rigidity to the rest of the first and/or second electrode comprising the projection(s). For example, the projection(s)/spacer(s) may be formed in a different moulding step.

The projection(s)/spacer(s) may be substantially rigid, such that the projection(s)/spacer(s) maintain a fixed separation between the first and second electrodes at or near to the projection(s)/spacer(s) upon application of a pressure or force. In another example, the projection(s)/spacer(s) may be substantially deformable and/or resilient, such that the projection(s)/spacer(s) are compressible upon application of a pressure or force to provide a changeable separation/gap between the first and second electrodes at or near to the projection(s)/spacer(s).

The pressure or force required to change/reduce and/or close the gap(s) may be partially determined by the flexibility/deformability of the first, second electrode and/or the separation element(s), and partially determined by the dimensions (i.e. width and height) of the gap(s) or gapped portion/region(s). As such, the thickness of the spacer layer and the width of the or each through-hole or opening may be configured to set a predetermined pressure or force required to reduce/change or close the gap (of the or each respective gapped portion/region). Alternatively, the length of the or each projection/spacer and the width of the region either side of and/or between the one or more projections/spacers may be configured to set a predetermined pressure or force required to close the or each gap (of the or each respective gapped portion/region). This may be used to tune or tailor the pressure-sensitivity of the device in addition of instead of tuning the flexibility/deformability of the first and/or second electrode.

The first electrode and/or the second electrode may have an electrical resistivity in the range of substantially $1 \times 10^2$-$1 \times 10^6$ Ohm·cm. The resistance between any two points on the first electrode and/or the second electrode may be between substantially 1 kOhm and 1 MOhm measured over a distance of about 10 cm. Having a large resistivity means that the magnitude of the measured change in capacitance varies more strongly with the distance between the location of the applied pressure on the device and an individual sensing point, thus increasing the pressure sensitivity of the device and/or the position sensing resolution.

The resistivity and/or resistance of the first electrode and/or the second electrode may be tuned via the intrinsic material properties (i.e. intrinsic resistivity). Alternatively or additionally, the resistivity and/or resistance of the first electrode and/or the second electrode may be tuned without changing the intrinsic material properties by introducing instead one or more holes, hollows, recesses, thickness variations, and/or repeating geometric patterns/tracks into the first electrode and/or the second electrode. For example, the first electrode and/or the second electrode may be or comprise a complex shape and/or a repeating geometric pattern to provide a predetermined resistance between any two given points. There may be a plurality of hollows and/or recesses forming a regular array. The one or more holes, hollows and/or recesses may define a non-linear conduction path between the two points. Alternatively or additionally, the one or more hollows and/or recesses may define a plurality of linear and/or non-linear conduction paths between the two points.

The first electrode and the second electrode may be exchanged. For example, the second electrode may instead comprise the one or more sensing points connectable to the measurement module and/or sensing circuit.

According to a second aspect of the invention, there is provided a method of manufacturing the pressure sensing device of first aspect. The method may comprise forming the first electrode and the second electrode. The first electrode and/or the second electrode may be formed of or comprise a unitary piece of non-metallic conductive material. The first electrode and/or the second electrode may be formed of or comprise a moveable and/or deformable and/or flexible non-metallic conductive material. The method may further comprise arranging the first and second electrodes in a spaced apart configuration, such that the first and second electrodes are separated by a distance. The method may further comprise providing the measurement module. The method may further comprise connecting the measurement module to one of the first or second electrodes at one or more sensing points or a plurality of sensing points on said electrode. The one or more sensing points may be distributed around the periphery or peripheral edge of the first or second electrode (evenly or unevenly). The method may further comprise connecting the measurement module to the other of the first or second electrodes at one or more reference or ground points on the other of the first or second electrode.

The method may further comprise spacing the first electrode from the second electrode, or vice versa, in a stacked arrangement. For example, the method may further comprise arranging the second electrode over, under, on top of, beneath, above or below the first electrode such that the second electrode is separated from the first electrode by a distance, and optionally such that there are one or more gapped portions/regions in which the first and second electrodes are separated by a gap. The first and second electrodes may be substantially planarly aligned.

The electrode (i.e. the first or second electrode) with the sensing point(s) may be referred to as a sense electrode. The other electrode (i.e. the second or first electrode, respectively) may be referred to as a reference or ground electrode.

The method may further comprise forming a plurality of sense electrodes and arranging the plurality of sense electrodes over, under, on top of, beneath, above or below the same reference electrode. The method may further comprise connecting the measurement module to each of the sense electrodes at the sensing point(s) on the respective sense electrode.

The method may further comprise forming a plurality of sense electrodes and a plurality of corresponding reference electrodes, and arranging each sense electrode with respect to the corresponding reference electrode, e.g. over, under, on top of, beneath, above or below the corresponding reference electrode (e.g. so that they are planarly aligned). The method may further comprise connecting the measurement module to each of the sense electrodes at the sensing point(s) on the respective sense electrode, and optionally connecting the measurement module to each of the reference electrodes at one or more reference or ground points on each of the reference electrodes.

Forming the first and/or second electrode may comprise a thermoforming and/or a moulding process. One mould may be used for moulding multiple sub-divisions of either electrode.

The method may further comprise forming one or more separation elements configured to separate the first and second electrode. The one or more separation elements may further be configured to provide or form the gap(s). Forming the one or more separation elements may comprise a thermoforming and/or a moulding process.

Forming the one or more separation elements may comprise forming a non-conductive separation or spacer layer. The spacer layer may be substantially flexible or rigid. The method may further comprise arranging the spacer layer between the first electrode and the second electrode to separate the first and second electrodes.

Forming the first and second electrode and/or the separation/spacer layer may comprise an injection-moulding, heat-pressing, heat-lamination and/or thermo-forming process. Such fabrication processes are inexpensive. Alternatively, forming the first and second electrode and/or the separation layer may comprise 3D printing, computer numerical control (CNC) machining/milling, laser or water jet cutting (e.g. of uniform sheets of material). The method of forming each electrode may comprise forming the first and/or second electrode together in attachment to a non-conductive surface and/or object (e.g. overmoulding the first and/or second electrode onto a piece of fabric on one side). In this arrangement, one mould is needed for moulding multiple sub-divisions of either electrode.

Forming the separation/spacer layer may further comprise forming one or more through-holes, openings or cut-outs in the spacer layer to provide the gap of the or each respective gapped portion. Forming the spacer layer may further comprise forming an array of through-holes in the spacer layer.

In another embodiment, forming the first and/or second electrode may comprise forming one or more projections extending from (a surface of) the first and/or second electrodes. Forming one or more projections may comprise forming an array of such projections. The projection(s) may be configured to serve as spacers. The spacer(s) may be configured to maintain the first and second electrodes in the spaced apart relationship. The spacer(s) may be integrally formed with the first and/or second electrode to form a monolithic structure (e.g. formed in the same moulding step). Forming the spacer(s) may comprise forming spacer (s) with a sidewall extending in a direction substantially perpendicular to the surface of the respective one of the first and second electrode. Alternatively, forming the spacer(s) may comprise forming spacer(s) with a sidewall substantially angled with respect to the surface of the respective one of the first and second electrode, such that the spacer(s) is/are substantially pointed and/or the distal end of the spacer(s) has/have a smaller foot-print or cross-sectional area than the proximal end.

Forming the first and second electrode may further comprise forming one or more through-holes, openings or cut-outs in one of the first and second electrodes configured to receive a portion of the or each projection/spacer, such that the spacer(s) do not contact the other of the first and second electrode when the first and second electrodes are arranged in the spaced apart configuration.

Optionally or preferably, forming the first and second electrode may comprise forming an array of said through-holes, openings or cut-outs in the one of the first and second electrode to receive the corresponding array of said projections/spacers in the other of the other of the first and second electrodes.

According to a third aspect of the invention, there is provided a method of operating the pressure sensing device of the first aspect. The method may comprise measuring a change in capacitance between the first and second electrodes, in response to a change to a distance (or optionally one or more gaps) between the first and second electrodes when a pressure or force is applied to the first and/or second electrode, at each sensing point individually and optionally at all sensing points simultaneously. The method may further comprise determining the area, location and/or amount of the applied pressure on the first and/or second electrode.

The step of determining the area, location and/or amount of the applied pressure on the first and/or second electrode may further comprise mapping each measurement obtained from an individual sensing point to a distance or proximity of the applied pressure/force from said individual sensing point. The step may further comprise determining the area and/or location of the applied pressure on the first and/or second electrode from the mapped distances. Determining the area may comprise determining the shape of the applied pressure. The method may further comprise determining a pressure area profile from the determined area, location and/or amount of the applied pressure.

The change of capacitance may measured at a measurement module. Measuring a change of capacitance at each sensing point individually may comprise scanning through each sensing point sequentially. Scanning may comprise selectively connecting and disconnecting each sensing point to/from the measurement module, such that only one sensing point or any combination of sensing points is connected to the measurement module at any given time. This may ensure the circuitry is not shorted when determining a location, area and/or amount of the applied pressure from an individual sensing point.

For example, while a measurement or reading is being taken from one sensing point, other (non-active) sensing points may be disconnected from the sensing circuit. The scan frequency may be sufficiently high compared to a typical movement of the body to minimise any measurement lag, e.g. such that the measurement/detection may be perceived to be in real-time. For example, the scan rate may be in the range 100-200 Hz. The scan rate may be slower or faster depending on the application.

By scanning through multiple individual sensing points, a separate measurement/reading is taken from each different location in a short (ignorable) span of time, which collectively builds up a pressure area profile and informs the amount of pressure exerted in an area without modulating the material to prevent short-circuit. This can save significant manufacturing costs compared to conventional sensing technologies comprising a plurality of discrete sensor electrodes, where each electrode is only responsible for a small local area and a considerable amount of electrode modules (i.e. sensing elements) is needed to cover a large sensing surface, such as a seat.

Measuring a change of capacitance at each sensing point simultaneously may comprise connecting each sensing point to the measurement module.

Measuring a change may comprise measuring, at a measurement module using a single input pin of a capacitive sensing chip.

According to a fourth aspect of the invention, there is provided a shoe insole comprising one or more pressure sensing devices according to the first.

According to a fifth aspect of the invention, there is provided a seat for an automobile or aircraft comprising one or more pressure determining devices according to the first aspect.

According to a sixth aspect of the invention, there is provided a consumer product comprising one or more pressure sensing devices according to the first. The consumer product may be or comprise a phone case, laptop, or a surface of a wall, table or object, wherein the one or more pressure sensing devices are configured to provide one or more trackpads. The consumer product may be connectable to a computing device to provide a user interface to control one or more functions of the computing device based on the determined location, area and/or amount of pressure applied to the one or more sensing devices.

Aspects and/or embodiments of the invention may comprise any one or more of the features described or defined herein. Features which are described in the context of separate aspects and/or embodiments of the invention may be used together, may be removed or replaced, and/or be interchangeable. Similarly, where features are, for brevity, described in the context of a single embodiment, these may also be provided separately or in any suitable sub-combination. Features described in connection with the device may have corresponding features definable with respect to the method(s) and vice versa, and these embodiments are specifically envisaged.

BRIEF DESCRIPTION OF DRAWINGS

In order that the invention can be well understood, embodiments will now be discussed by way of example only with reference to the accompanying drawings, in which:

FIG. 14 d-e shows the sensing layer formed in an arbitrary shape;

FIG. 16a shows a plurality of pressure sensing devices incorporated into a seat;

FIG. 16b shows schematically different pressure maps obtained from the seat of FIG. 16a;

Figure 1:
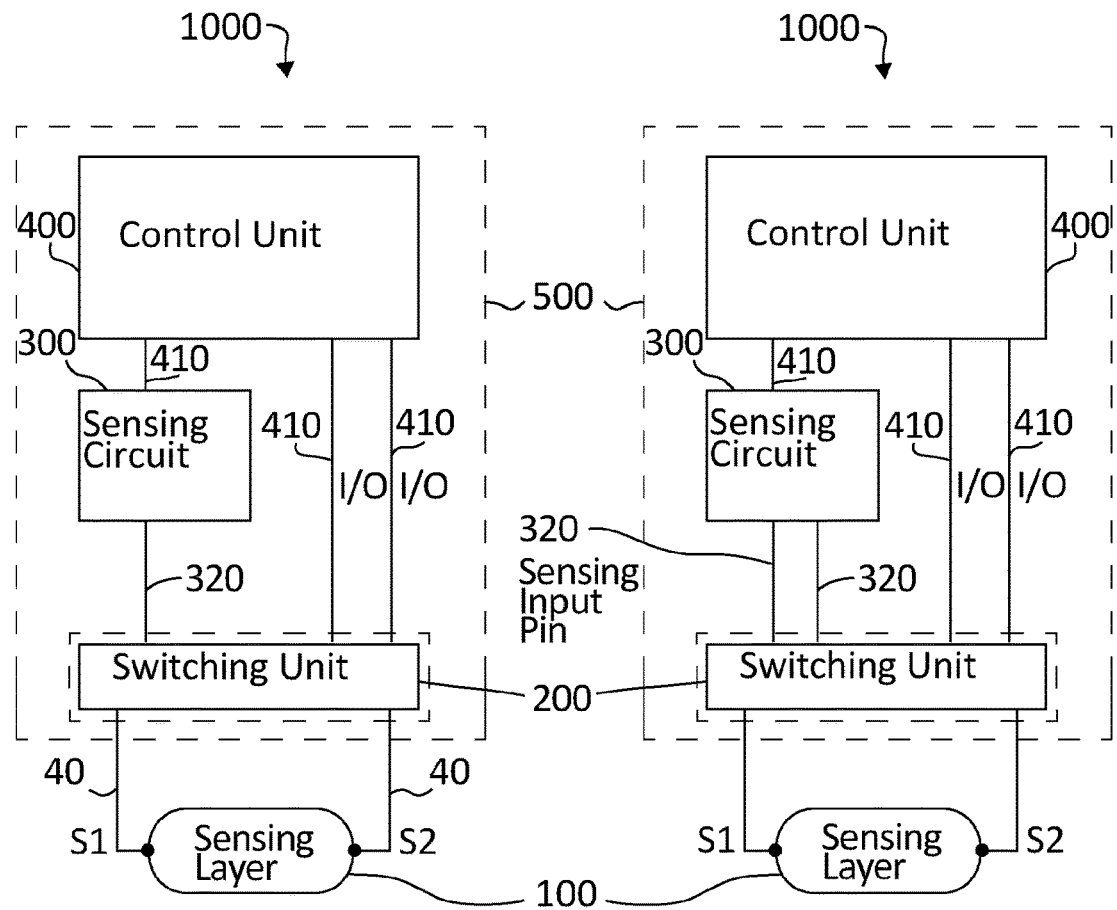
FIGS. 1a and b show in the top panel schematic diagrams of a pressure sensing device according to the invention and in the bottom panel the switching unit of the device in the top panel.
Figure 1:
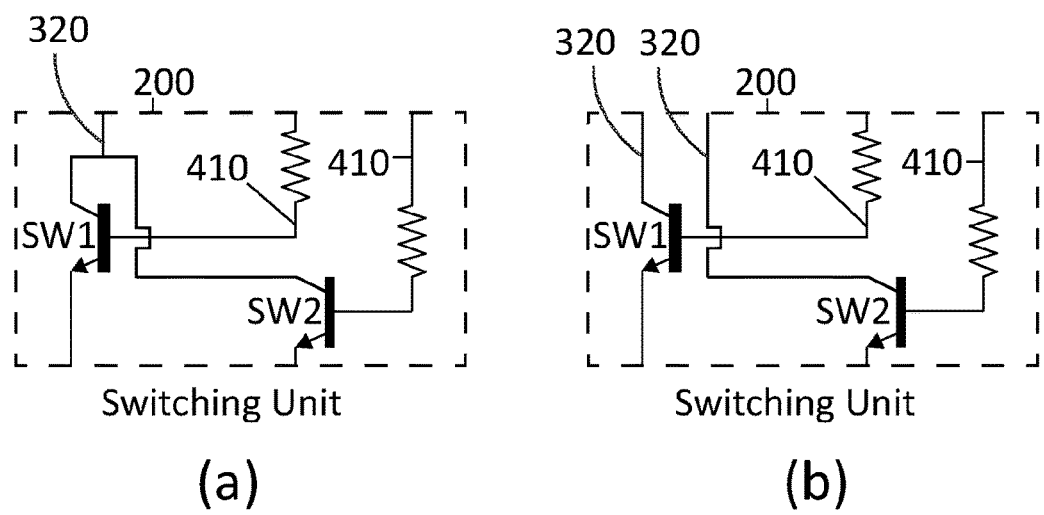

It should be noted that the figures are diagrammatic and may not be drawn to scale. Relative dimensions and proportions of parts of these figures may have been shown exaggerated or reduced in size, for the sake of clarity and convenience in the drawings. The same reference signs are generally used to refer to corresponding or similar features in modified and/or different embodiments.

DETAILED DESCRIPTION

FIG. 1a (top panel) shows a schematic diagram of a pressure sensing device 1000 according to an embodiment of the invention. The device 1000 comprises a pressure sensing layer 100 connected to a measurement module 500 at a plurality of sensing points S1, S2 located at or near the periphery of the sensing layer 100. The sensing layer 100 is configured to provide a change in an electrical signal (capacitance) in response to a pressure or force applied on or to (either side of) the sensing layer 100, as will be discussed in more detail below with reference to FIG. 2. The measurement module 500 is configured to measure the electrical signal(s) and determine the location, area and amount of applied pressure on the sensing layer 100 based on the measured electrical signal(s).

The measurement module 500 comprises a sensing circuit 300 configured to measure the pressure-induced changes in capacitance at the sensing points S1, S2. In an embodiment, the sensing circuit 300 is a capacitive sensing chip with one or more sensing/input channels or pins 320, such as a capacitive sensing micro-processor or micro-controller. The sensing circuit 300 is connected to the sensing points S1, S2 via a switching unit 200 (an example of which is shown in more detail in the bottom panel of FIG. 1a). The switching unit 200 is configured to selectively connect and disconnect the sensing points S1, S2 to/from the sensing circuit 300. The switching circuit 200 comprises a plurality of switching elements SW1, SW2, such as transistors (e.g. general purpose, PNP and/or NPN transistors), relays and/or any other controllable switching elements known in the art. In the embodiment shown in FIG. 1a, each sensing point S1, S2 is connected to the same input pin 320 of the sensing circuit 300 via the switching elements SW1, SW2. The switching unit 200 thus enables the sensing circuit 300 to obtain measurements or readings from each sensing point S1, S2 individually, all sensing points S1, S2 simultaneously, and/or any combination of sensing points S1, S2 using only a single input pin 320 by selectively connecting/disconnecting each sensing point S1, S2. Alternatively, each sensing point S1, S2 may be connected to a different input pin 320 of the sensing circuit 300, as shown in FIG. 1b. The measurement configurations will be described in more detail below with reference to FIGS. 10 and 11.

Each sensing point S1, S2 is connected to the measurement module 500 via a conductive trace 40. For example, the conductive trace 40 may be or comprise a wire, conductive thread, or conductive track on a substrate or printed circuit board (or a separate spacer layer, see FIGS. 7a and 7b), which may be flexible (not shown). Although only connections to the input pins(s) 320 are shown in FIGS. 1a and 1b, there may be additional connections between the sensing layer 100 and the sensing circuit 300 required for the measurements (not shown). For example, one or more portions of the sensing layer 100 may be connected to a ground or reference pin of the sensing circuit 300 via a conductive trace 40 (see below).

The measurement module 500 further comprises a control unit 400 connected to the switching unit 200 to control the switching elements SW1, SW2 and thus control the connections between the sensing points S1, S2 and the sensing circuit 300. The control unit 400 may be or comprise a microcontroller or a microprocessor chip. The control unit 400 comprises multiple input/output (I/O) channels 410 connected to the respective control inputs/terminals of the switching elements SW1, SW2 that provide output signals configured to control the timing and frequency of the switching of each switching element SW1, SW2. The timing and frequency of the switching may be controlled by a software program running on the control unit 400 or another computing device in communication with the control unit 400. Example configurations of the controllable switching elements SW1, SW2 are shown in the bottom panels of FIGS. 1a and 1b for the case of transistors. It will be appreciated that the above switching operation may be achieved in other ways and/or using other active or passive switching components.

Figure 12:
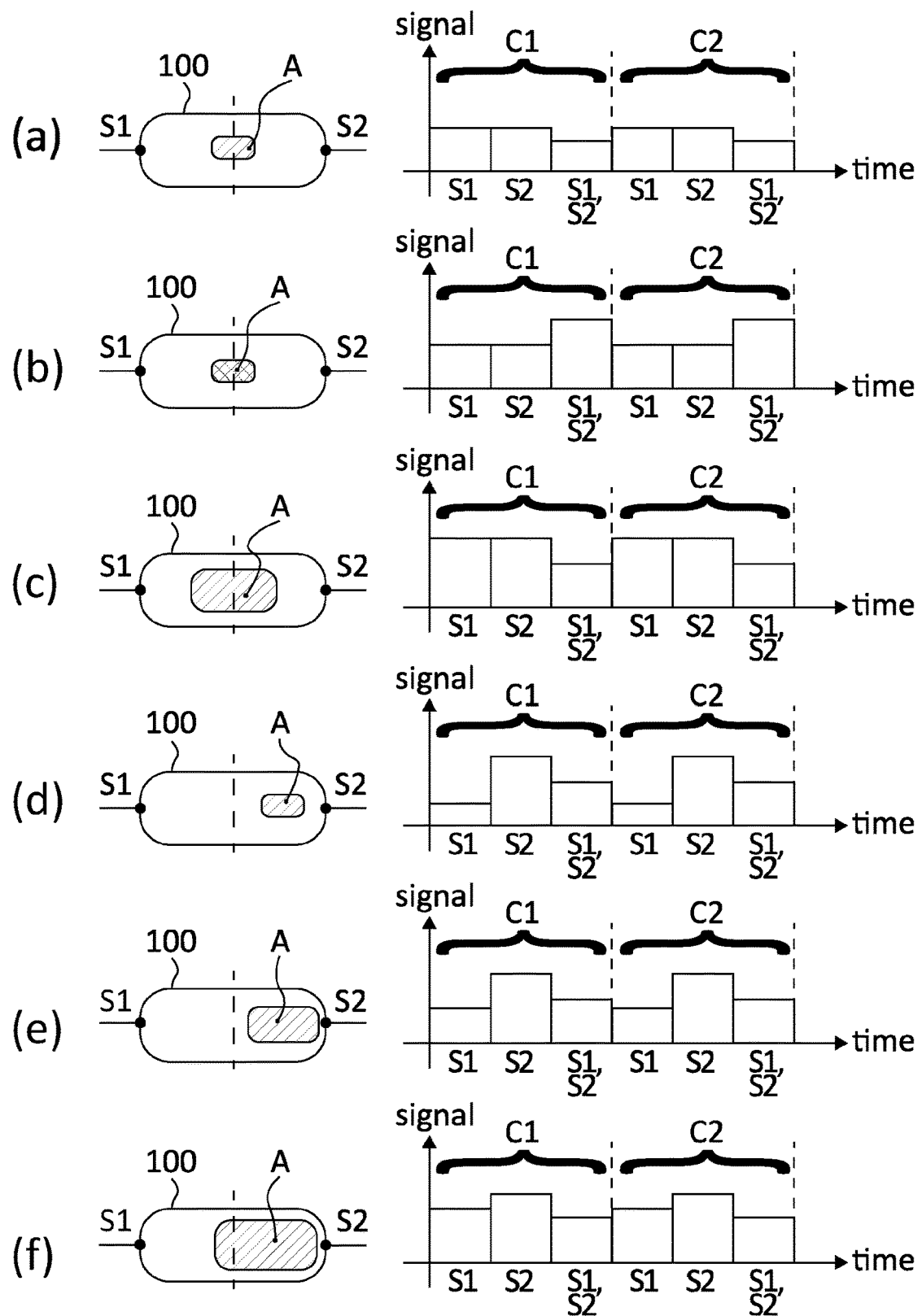
FIGS. 12a-f show example measurements for different applied pressure profiles.
Figure 13:
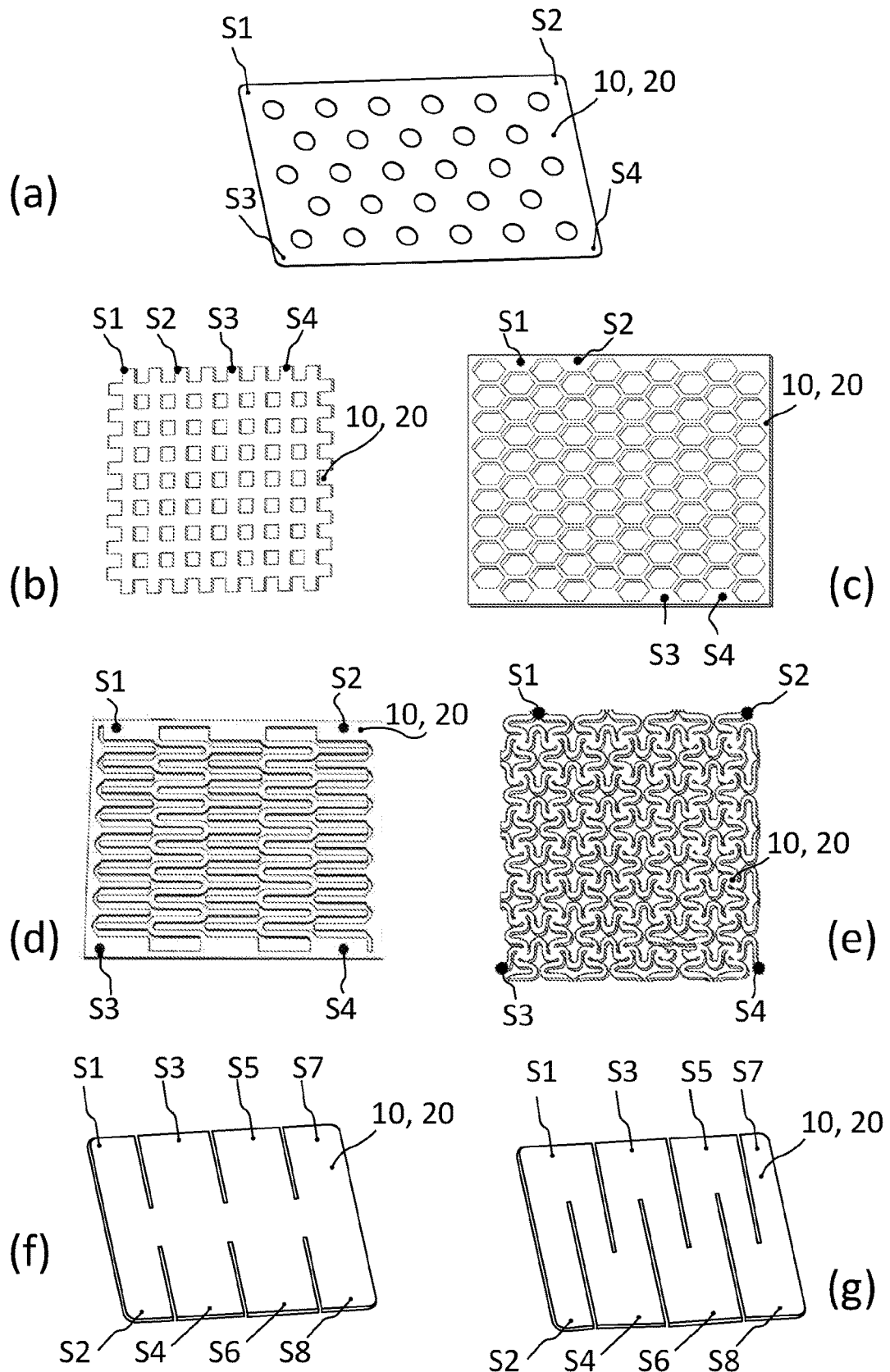
FIGS. 13 a-g show different configurations of an electrode of the sensing layer of FIG. 3 to control its resistance.

The control unit 400 is further configured to receive measurement data from the sensing circuit 300 (e.g. via an I/O channel 410) for determining the location, area and amount of applied pressure. Calculations of the location, area and amount of applied pressure can be performed on-chip using suitable software running on the control unit 400. The control unit 400 may be configured to store, process and/or analyse the data. Alternatively or additionally, the control unit 400 may be in communication with a remote computing device running software configured to receive, process, store and/or analyse the measurement data from the control unit 400 (not shown). For example, the computing device may be configured to visualise the data obtained from the device 1000. The computing device may comprise a user interface configured to visualise the data and control the device 1000. Determination of the location, area and amount of pressure will be discussed in more detail below with reference to FIG. 12.

The sensing layer 100 is configured to provide pressure-induced changes in capacitance through deformation of the sensing layer 100 that can be measured by the sensing circuit 300 at the sensing points S1, S2. Alternatively, This allows the sensing circuit 300 to be or comprise a commercially available capacitive sensing microprocessor (CSM) or microcontroller. Such CSMs are generally cheaper and require fewer sensing input pins 320 compared to pressure sensing microprocessors or load cells. In the embodiment of FIG. 1a where each sensing point S1, S2 is connected to the same input pin 320, the lower number of input pins in use allows the use of cheaper alternative CSMs (e.g. with few-channels), rather than multi-channel CSMs with a higher number of pins (e.g. 8 channels vs 16 channels).

Figure 2A:
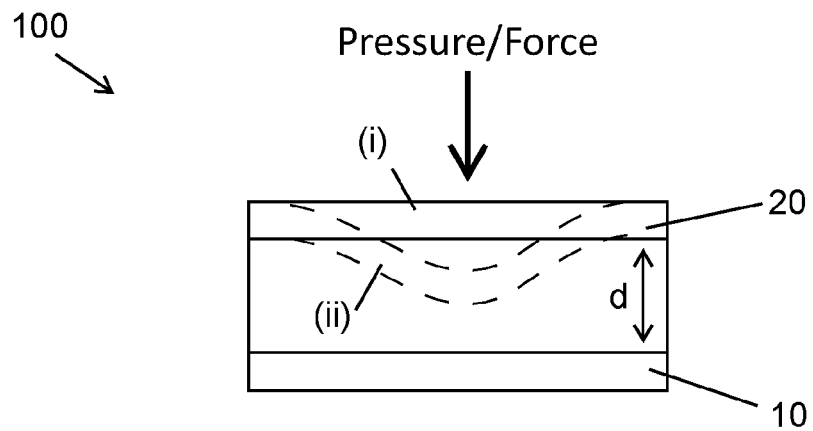
FIGS. 2a and 2b show schematic cross-sections of the sensing layer of the device of FIG. 1 according to embodiments of the invention.

FIG. 2a shows a cross-sectional view of a generalised pressure sensing layer 100 to illustrate the general form and operating principle of the device 1000. The sensing layer 100 comprises a first electrode 10 and a second electrode 20 spaced apart from the first electrode 10 in the thickness direction Z, such that the electrodes 10, 20 are separated from each other by a distance d. In other words, the two electrodes 10, 20 are arranged in a stacked configuration, one over the other. Although the second electrode 20 is shown arranged over the first electrode 10, the order of the two electrodes 10, 20 can be exchanged. For example, the second electrode 20 may instead be arranged beneath/below the first electrode 10.

The first electrode 10 and/or the second electrode 20 is formed of or comprises a moveable and/or deformable and/or flexible material. One or each of the first electrode 10 and the second electrode 20 may be moveable with respect to each other, or the first electrode 10 and/or the second electrode 20 may deform and/or flex, to reduce/change the distance d between the electrodes 10, 20 (uniformly or non-uniformly) in one or more locations in response to a pressure or force applied to or on either electrode 10, 20 (i.e. from either or both sides of the sensing layer 100). This is illustrated in FIG. 2a which shows the second electrode 20 in a substantially un-deformed/un-flexed position (i) in the absence of a pressure/force, and a substantially deformed/flexed position (ii) in the presence of a pressure or force applied to the second electrode 20 from the second electrode 20 side of the sensing layer 100 that decreases the distance d, as indicated by the arrow. Therefore, at least the electrode to which a pressure or force is to be applied is substantially deformable and/or flexible, or capable of flexing, in order for the device 1000 to operate. The other electrode may be substantially rigid or deformable/flexible, depending on the application. For example, if the entire sensing layer 100 is required to be flexible, then both electrodes 10, 20 can be deformable/flexible.

The capacitance of the first electrode 10 is influenced by the proximity to or distance from the second electrode 20, and vice versa. As such, a change/reduction in the distance d in response to a pressure or force applied on or to the sensing layer 100 results in a change in capacitance between the first and second electrodes 10, 20 that can be measured by the sensing circuit 300 at the sensing points S1, S2. This is the basis of the operating principle of the device 1000, which will be described in more detail below. Further, the operation of the device 1000 does not rely on any capacitive coupling of the electrodes 10, 20 with the object or body providing the pressure/force.

The sensing points S1, S2 can be located on either the first electrode 10 or the second electrode 20. The electrode with the sensing points S1, S2 is the sense electrode. The other electrode is a reference electrode connected at one or more reference points to a ground or reference pin of the sensing circuit 300 (not shown).

The distance d or space between the electrodes 10, 20 may be substantially empty, such that the electrodes 10, 20 are separated from each other by a gap, such as an air gap or void. Alternatively, the space between the electrodes 10, 20 can be at least partially filled or occupied by a non-conductive spacer layer or spacer material that is substantially compressible and resilient to permit the distance d between the electrodes 10, 20 to change under an applied pressure/force (not shown). For example, the spacer layer/material may be formed of or comprise ABS, EVA, PU, rubber or a foam.

Figure 2B:
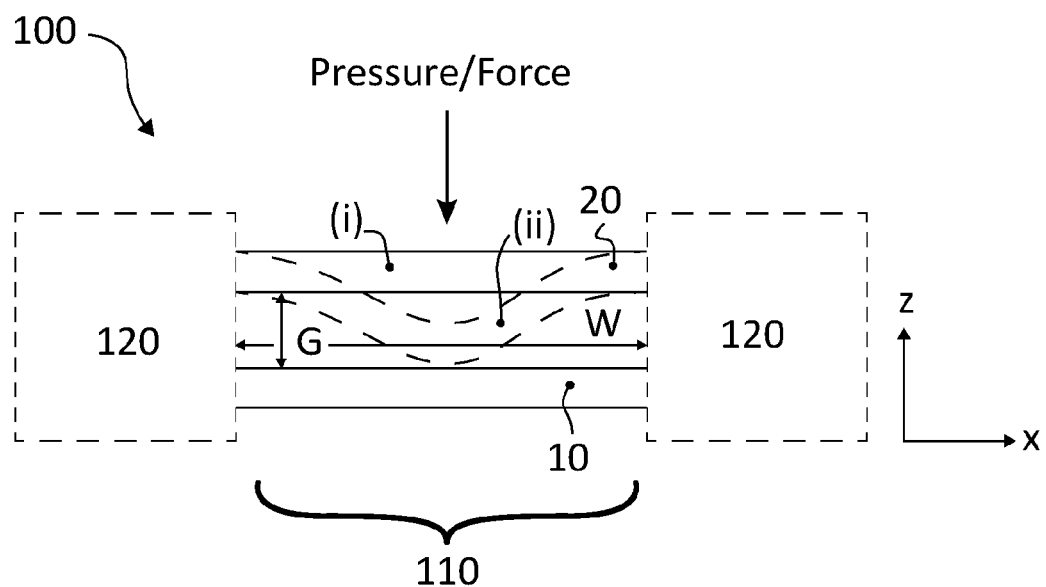

FIG. 2b shows an example of a sensing layer 100 in which the electrodes 10, 20 are separated from each other by a gap. In this embodiment, the sensing layer 100 comprises one or more gapped portions 110 in which the first and second electrodes 10, 20 are separated by the gap. Outside the gapped portion(s) 110 are one or more support portions 120 in which first and second electrodes 10, 20 are separated by one or more separation elements (not shown). The separation element(s) are configured to maintain a separation between the first and second electrodes 10, 20 and provide or form the gap(s). As such, the separation element(s) support the overall structure of the sensing layer 100. The separation element(s) may be separate from or integral with the first and/or second electrodes 10, 20, as shown in FIGS. 3 and 4 to 7 and described below.

The first electrode 10 and the second electrode 20 are formed of or comprise a unitary piece of non-metallic conductive material, such as a conductive plastic or a polymer (e.g. conductive acrylonitrile butadiene styrene (ABS), conductive ethylene vinyl acetate (EVA), or conductive polyurethane (PU)). Such materials are thermoformable and can therefore be formed using known moulding processes, such as injection moulding, heat pressing or any other thermoforming process. This significantly increases the design freedom for the electrode shape and the device 1000 itself.

In an embodiment, the electrical resistivity of the sense electrode (i.e. the first or second electrode 10, 20) is in the range of substantially $1 \times 10^2$-$1 \times 10^6$ Ohm·cm. This means that the resistance between any two points on the sense electrode measured over a distance of about 10 cm is between substantially 1 kOhm and 1 MOhm. The reference electrode (i.e. the other of the first or second electrode 10, 20) may have the same or different resistivity to the sense electrode. For example, the reference electrode may have a substantially lower resistivity than the sense electrode.

Figure 3:
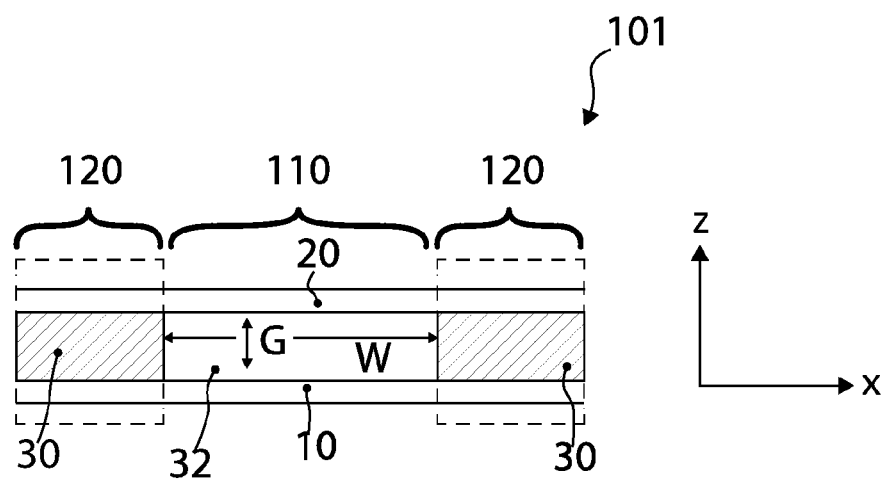
FIG. 3 shows a schematic cross-section of the sensing layer of the device of FIG. 1 according to the invention.

FIG. 3 shows an embodiment of a sensing layer 101 in which the separation element(s) is or comprises a non-conductive separation or spacer layer 30 positioned between the first and second electrodes 10, 20. The spacer layer 30 comprises one or more openings 32 that form/provide the gap(s), and thus form the gapped portion(s) 110 and the support portion(s) 120. The width W of the gap(s) or gapped portion(s) 110 is defined by the size and shape of the opening 32. As such, the spacer layer 30 separates and also electrically isolates the first and second electrodes 10, 20 in the support portions 120.

The spacer layer 30 can be formed of or comprise a non-conductive plastic or polymer material (e.g. ABS, EVA, or PU), or any other thermoformable non-conductive material. In this way, the spacer layer 30 can also be formed using a moulding process. Alternatively, the spacer layer 30 can be formed of or comprise a fabric or a fibrous material, such as paper. Where the spacer layer 30 is formed of or comprises a thermoformable non-conductive material and is produced by a moulding process, the opening(s) 32 may be formed by the same moulding process. Alternatively, the opening(s) 32 may be formed by selectively cutting or removing material from a uniform sheet forming the spacer layer 30.

The spacer layer 30 may be substantially rigid or deformable/flexible, depending on the application. For example, if the entire sensing layer 100 is required to be flexible, then both the first and second electrodes 10, 20 and the spacer layer 30 can be formed of or comprise deformable/flexible materials. Where the spacer layer 30 is flexible/deformable it may be able to compress under an applied pressure thus changing the gap between the first and second electrodes 10, 20. In this case, the sensing layer 101 may be responsive to pressure applied to or on the support portions 120 as well as the gapped portions 110.

Although the sensing layer 101 is shown as a tri-layer structure, it will be appreciated that the sensing layer 101 may comprise additional conductive/non-conductive layers without altering the operating principle of the device 1000. For example, the spacer layer 30 itself may formed as a multi-layer structure.

FIGS. 4a-4c show alternative embodiments of a sensing layer 102 in which the first and second electrodes 10, 20 are separated and the gap is formed without using a separate spacer layer 30. In this embodiment, the separation element(s) is or comprises one or more projections 24 that extend from an inner surface 20i of the second electrode 20 to server as spacers (although it will be appreciated that either or both electrodes 10, 20 may comprise such projection(s)). The spacer(s) 24 of the sensing layer 102 are integrally formed with the first and/or second electrode 10, 20 thus forming a monolithic structure (e.g. formed during the same moulding process). In this embodiment, the width W of the gap or gapped portion(s) 110 is defined by the region between adjacent spacers 24 and/or the region surrounding a spacer 24.

In the embodiment of FIG. 4a, the spacers 24 are located beyond the periphery of the first electrode 10 and extend to a (non-conductive) support surface S, such that they do not contact the first electrode 10. In the embodiment of FIG. 4b, the spacers 24 extend through one or more openings 12 in the first electrode 10 to the support surface S, such that they do not contact the first electrode 10 (i.e. the spacers 24 fit within the opening(s) 12 such that they do not contact the sides of the openings 12). In both examples, the spacer(s) 24 extend in the thickness direction of the sensing layer 102 (i.e. the Z-direction) to a length that is greater than the thickness of the first electrode 10. This ensures that, when the first electrode 10 is placed against a surface S, the spacer(s) 24 supports the second electrode 20 against the surface S at a spaced apart relationship to the first electrode 10 and forms/provides the gap, as shown. Further, as the spacers 24 do not contact the first electrode 10, the first and second electrodes are electrically isolated.

Where the electrode comprising the spacers 24 is deformable, the spacers 24 are able to compress under an applied pressure, thus changing the gap between the first and second electrodes 10, 20. In this case, the sensing layer 102 may be responsive to pressure applied to or on the support portions 120 as well as the gapped portions 110.

In an alternative configuration shown in FIG. 4c, the spacers 24 supporting the electrode 20 may rest directly on the surface 10i of the first electrode 10. Due to the relatively high resistivity of the electrodes 10, 20, substantial shorting of the electrodes is avoided and the capacitance measurement is not compromised. In this case, the spacers 24 may be configured to minimise the contact area between the distal end of the spacer 24 and the first electrode 10. For example, the spacers 24 may be substantially convex or pointed, as shown in FIG. 4c. In this way, when pressure is applied to the sensing layer 102, the contact area between the spacer 24 and the first electrode 10 can increase due to the deformable nature of the first and/or second electrode 10, 20 material, thus producing a change in the measured capacitance, in addition to that produced from a change in the gap alone. The sensing layer 102 may therefore be responsive to pressure applied to or on the support portions 120 as well as the gapped portions 110.

As the spacers 24 are integrally formed with the first and/or second electrode 10, 20, manufacture and assembly of the sensing layer 102 may be simplified compared to the sensing layer 101 requiring a separate spacer layer 30. The spacers 24 may be formed of or comprise the same material as the first and/or second electrode 10, 20 and therefore have the same electrical and/or mechanical properties as the first and/or second electrode 10, 20. Alternatively, the spacers(s) 24 can be formed of or comprise a different material and/or have different electrical and/or mechanical properties to the first and/or second electrode 10, 20, e.g. by using a two-step over-moulding process (as indicated by the dotted lines in FIGS. 4b and 4c). In this way, the spacer(s) 24 may be formed of or comprise a non-conductive material, e.g. to ensure the electrodes 10, 20 remain electrically isolated even when the spacers 24 rest directly on the inner surface 10i of the first electrode 10 as seen in FIG. 4c.

Due to the absence of a spacer layer 30, the sensing layer 102 may be suited to scaling down to small sizes, since the size and geometry of the integral spacer(s) 24 and/or opening(s) 12 can be controlled more accurately during the moulding process. For example, features sizes down to 0.1 mm with a 0.01 mm tolerance can be achieved using injection moulding, allowing small pressure sensing devices, e.g. with XYZ dimensions as small as 0.5-1 mm, with specific shapes/contours to be produced, and easily integrated with a small product/object. By contrast, it is difficult to fit off-the-shelf electronic pressure sensors or load cells into small product/objects.

The device 1000 is responsive to applied pressures that reduce the gap as well as applied pressures that close the gap. The pressure-sensitivity of the sensing layers 100, 101, 102 is determined by how easily the electrode to which the pressure is applied can deform and flex to reduce and eventually close the gap. This is determined by the rigidity/flexibility of the first and/or second electrode 10, 20 and the geometry of the gap or gapped portions 110, i.e. the height and width W of the gap. For example, the larger the width W of the gap the easier it is to deform and flex the first and/or second electrode 10, 20. Also, the smaller the height of the gap the less pressure/force is required to close the gap. As discussed above, the geometry of the gap or gapped portions 110 is predominantly determined by the separation elements, i.e. thickness spacer layer 30 and size/shape of the openings 32 (for sensing layer 101) or the length and arrangement of the spacers 24 (for sensing layer 102). Further, it will be appreciated that flexibility/rigidity of the electrodes 10, 20 of the sensing layer 100, 101, 102 is itself determined by the electrode material's (intrinsic) mechanical properties and its geometry, such as the thickness of the first and/or second electrode 10, 20. Due to the mouldable materials used, the geometry of the electrodes 10, 20 and the gap can be readily tuned through design to tailor the flexibility and therefore the pressure sensitivity of the device 1000 to meet the needs of a particular application. For example, the inner surface 10i, 20i of either electrode 10, 20 may comprise one or more recesses, ridges and/or undulations 20r to enhance the flexibility, as shown in in FIG. 4a.

In addition, the size of the signal measured by the sensing circuit 300 for a given applied pressure profile (the responsivity) is linked to the total area of deformation. This is linked to the dimensions of individual gapped portions 110, but also to the fill factor of the sensing layer 100, 101, 102, i.e. the ratio of the total area of the sensing layer 100, 101, 102 occupied by the gapped portion(s) 110 to the total area of the sensing layer 100, 101, 102. The fill factor can be controlled independently from the dimensions of the individual gapped portions 110, e.g. through the number and density of openings 32 or spacers 24. As such, multiple design variables can be adjusted to tune to the device sensitivity according to the application.

FIGS. 5a-c show an embodiment of the sensing layer 101 in which the spacer layer 30 comprises an array of openings 32. Each opening 32 forms and/or provides a separate gapped portion 110. As such, a pressure or force applied to the sensing layer 100 will change the gap in one or more gapped portions 110 that can be detected as a change in capacitance by the sensing circuit 300 (not shown). In this example, the sensing layer 101 comprises four sensing points S1, S2, S3, S4 on the second electrode 20. The first electrode 10 is connected to ground. Alternatively, the sensing points S1, S2, S3, S4 can be located on the first electrode 10 and the second electrode 20 can be connected to ground. The plurality of openings 32 may be substantially the same size and shape, as shown, or may be different sizes and shapes (not shown). In addition, the openings 32 may form a regular array as shown (e.g. a repeating geometric pattern), or may form an irregular pattern (not shown). One or more openings 32 may form an elongate straight or curved line or wave pattern (not shown).

FIGS. 6a and 6b show an embodiment of the device 1000 with a sensing layer 101 configured as a pressure sensing shoe insole. The insole device 1000 comprises a plurality of first electrodes 10a-10f, a single unitary spacer layer 30 and a single unitary second electrode 20. Each first electrode 10a-f is a sense electrode comprising a plurality of sensing points S1-S12 distributed around their peripheries for connecting to the measurement module 500 via the traces 40. The second electrode 20 is the reference electrode for connecting to the ground/reference pin of the measurement module 500. In this way, the single unitary reference electrode serves as the reference electrode for each separate sense electrode, simplifying assembly and manufacture. In this example, the first electrodes 10a-f forming the sense electrodes are beneath the reference electrode. This allows the sense electrodes to conform to a (typically flat) shoe sole, while the reference electrode can be formed/moulded into the 3D shape of a typical insole, as shown in FIG. 6b. This arrangement also allows the grounded reference to shield the sense electrodes from any parasitic external capacitance, e.g. originating the user's foot. The upper side of the second electrode 20 may be coated or covered with a non-conductive material to provide (electrical and physical) protection and/or water resistance, e.g. the covering/coating may be a waterproof fabric.

The first electrodes 10a-f are arranged according to typical pressure zones of a foot. Partitioning/dividing the sense electrodes in this way may provide improved spatial resolution of the pressure sensing. The spacer layer 30 comprises a plurality of openings 32 also arranged in zones, each zone corresponding to one of the first electrodes 10a-f. Similarly, in this example the single unitary spacer layer 30 serves as the spacer layer 30 for each first electrode 10a-f, simplifying assembly and manufacture. Alternatively, it will be appreciated that the (second) reference electrode and/or spacer layer 30 can be partitioned/divided into a plurality of separate spacer layers 30 to match the separate sense electrodes.

The conductive traces 40 are formed in or on a flexible substrate (e.g. a flexible PCB) that extends around the periphery of sensing layer 101, which in this case corresponds to the periphery of the shoe sole. Arranging the traces 40 in this way may increase the robustness of the insole device 1000, by reducing the direct pressure or forces exerted on the traces 40 by the foot and the associated wear and tear.

Each opening 32 provides a gapped portion 110 that is responsive to an applied pressure or force and contributes to the measured changes in capacitance at the sensing points. By scanning through each sensing point S1-S12 on each sensing layer 10a-10f, multiple forced locations/areas can be determined and a pressure area map can be built up. FIG. 6c shows an example pressure area map that may be obtained from the insole device 1000 of FIGS. 6a and 6b when worn by a user. Each circle represents a XY location on the map, and the radius of each circle represents the magnitude of the determined pressure or force at that location.

FIGS. 7a and 7b show an alternative embodiment of an insole device 1000 with sensing layer 101 in which the first electrode 10 is a single unitary sense electrode and the traces 40 are incorporated into the spacer layer 30. The traces 40 may be printed onto a non-conducive material as mentioned above. Alternatively, the traces 40 may be formed using conductive threads that are integrated into/onto the non-conductive material, e.g. a fabric. Incorporating the traces 40 into/onto the spacer layer 30 may simplify manufacture and assembly of the device 1000. FIG. 7c shows the corresponding example pressure area map that may be obtained from the insole device 1000 of FIGS. 7a and 7b when worn by a user.

Figure 6:
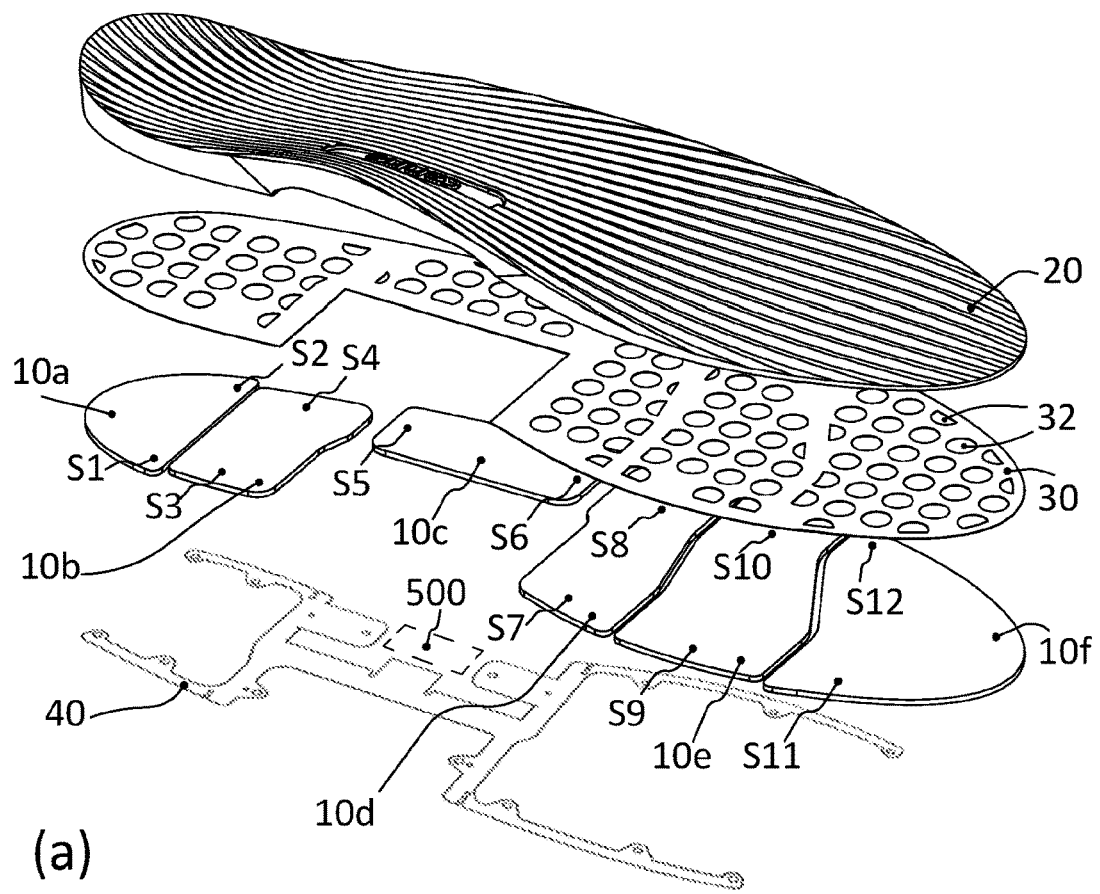
FIGS. 6a and b show, respectively, an exploded and a side view of an embodiment of a pressure mapping device with the sensing layer of FIGS. 2 and 5 incorporated into a shoe insole.
FIG. 6c shows an example pressure map from the device of FIGS. 6a and b.
Figure 6:
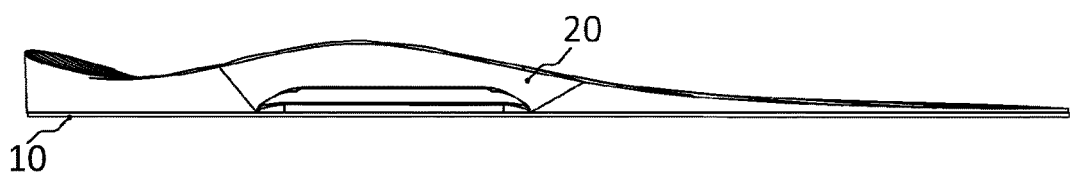
Figure 6:
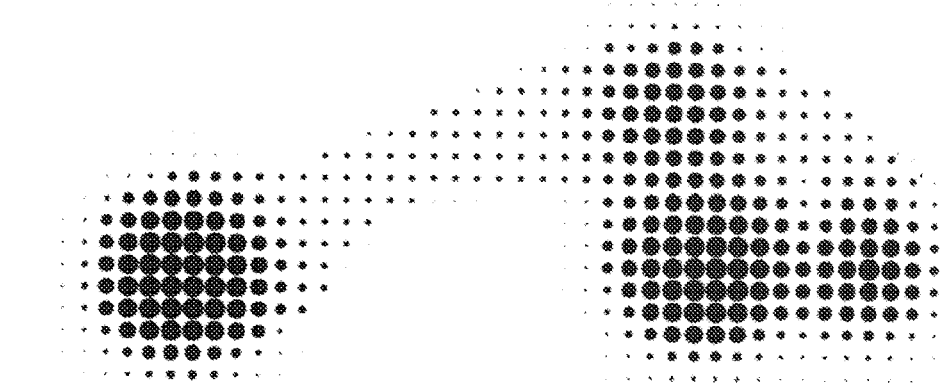
Figure 7:
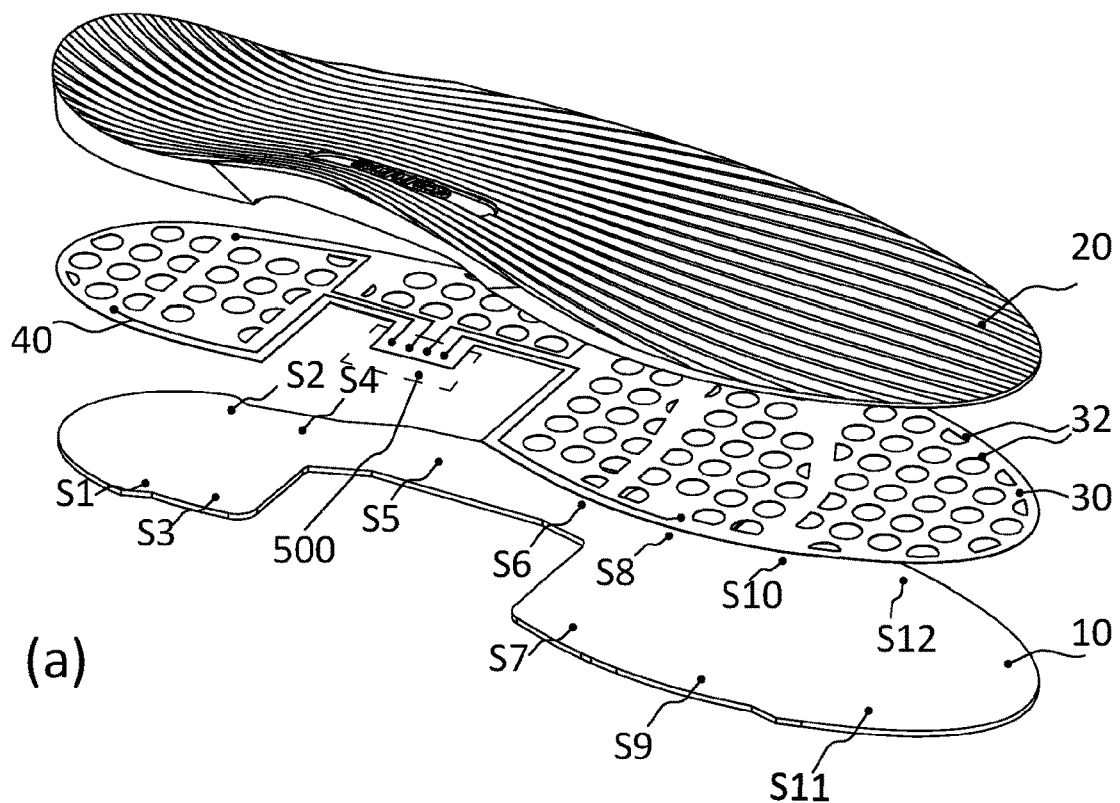
FIGS. 7a and b show, respectively, an exploded and a side view of another embodiment of a pressure mapping device with the sensing layer of FIGS. 3 and 5 incorporated into a shoe insole.
FIG. 7c shows an example pressure map for the device of FIGS. 7a and b.
Figure 7:
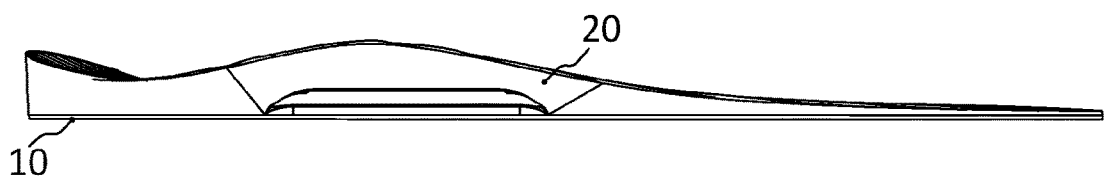
Figure 7:
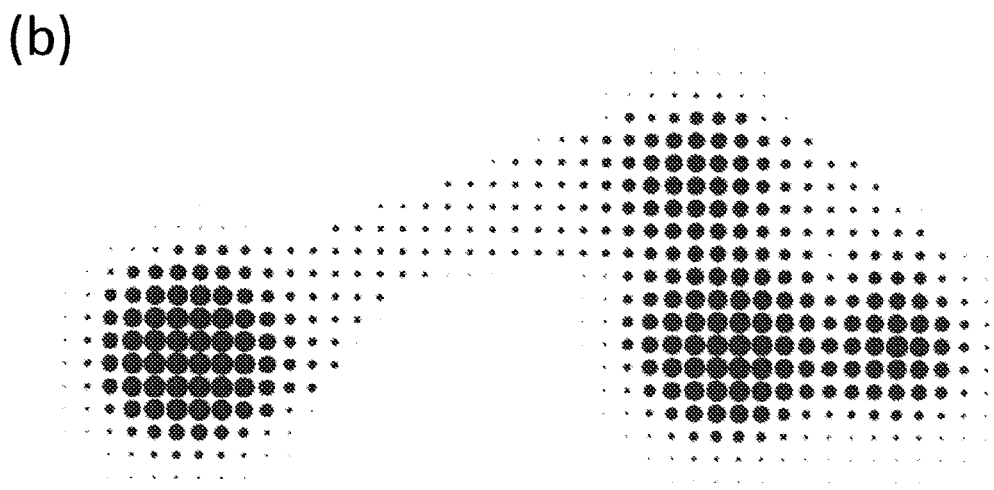

Although FIGS. 6 and 7 are shown as comprising a sensing layer 101 with a plurality of gapped portions 110, it will be appreciated that the device 1000 may be formed with one or more a sensing layers 100 without any gapped portions 110.

Figure 8:
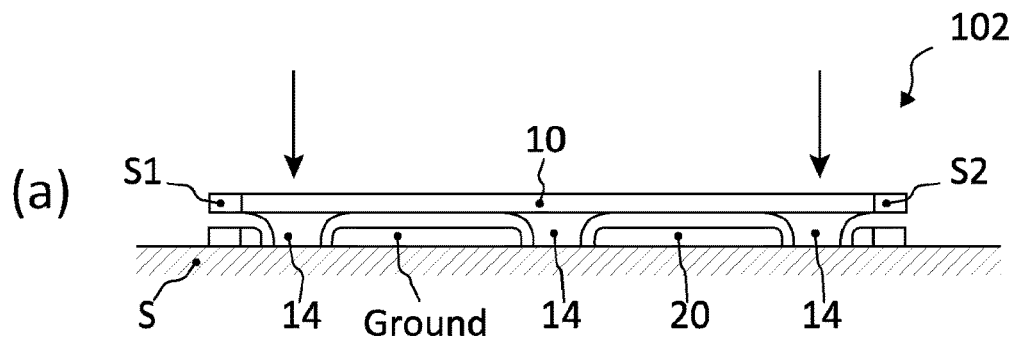
FIGS. 8a-c show, respectively, cross-sectional, exploded and top and side views of the sensing layer of FIG. 4b according to an embodiment.
FIG. 8d shows an example pressure map for the sensing layer of FIGS. 8a-c.
Figure 8:
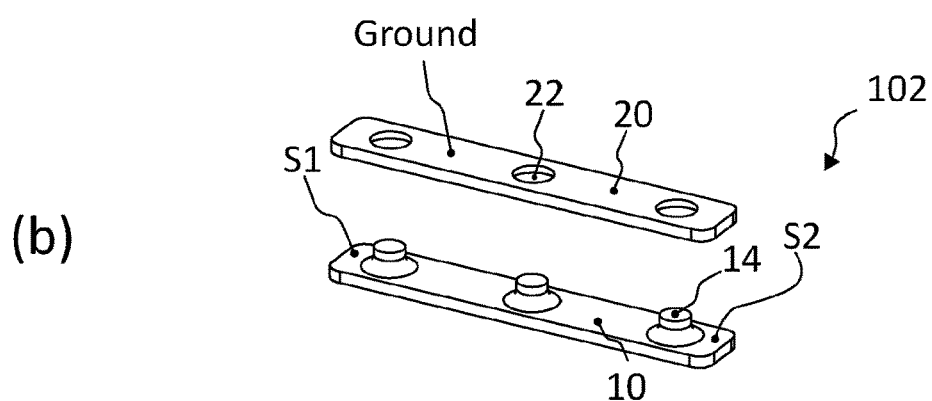
Figure 8:
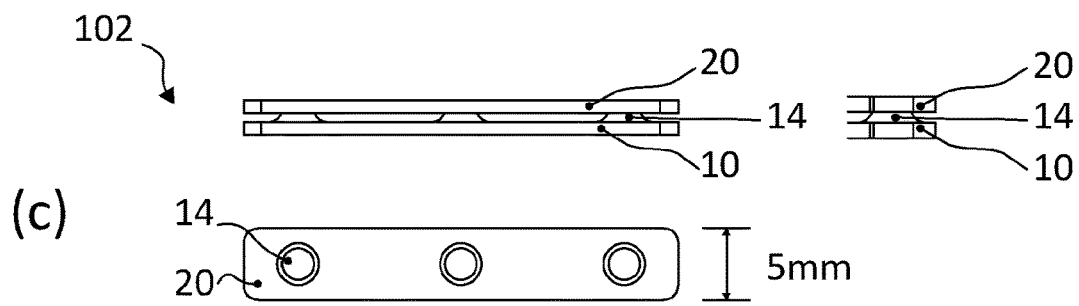
Figure 8:
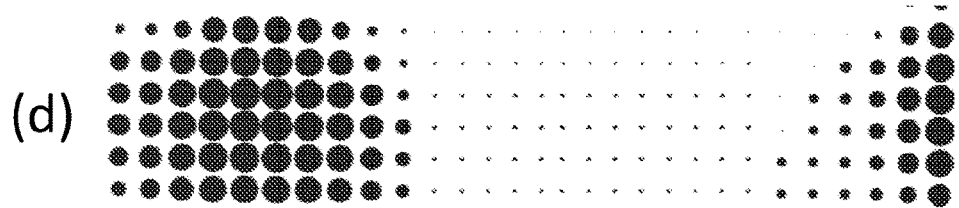

FIGS. 8a-c show an embodiment of the sensing layer 102 comprising three spacers 14 extending from the inner surface 10i of the first electrode 10 and three corresponding openings 22 formed in the second electrode 20. In this example, the spacers 14 and openings 22 are arranged in a linear array. The first electrode 10 is the sense electrode with sensing points S1, S2 at each end of the array, and the second electrode 20 is the reference electrode for connecting to ground. Additional sensing points may be provided around the periphery of the sense electrode. In this example, the width of the sensing layer 102 is approximately 5 mm. In use, the lower electrode, in this case the second electrode 20 can be secured to the surface S, e.g. by an adhesive. FIG. 8d shows an example pressure area map that may be obtained from the sensing layer 102 of FIGS. 8a-c when pressure is applied in two locations. As with FIGS. 6 and 7, each circle represents a XY location on the map, and the radius of each circle represents the magnitude of the determined pressure or force at that location.

Figure 9:
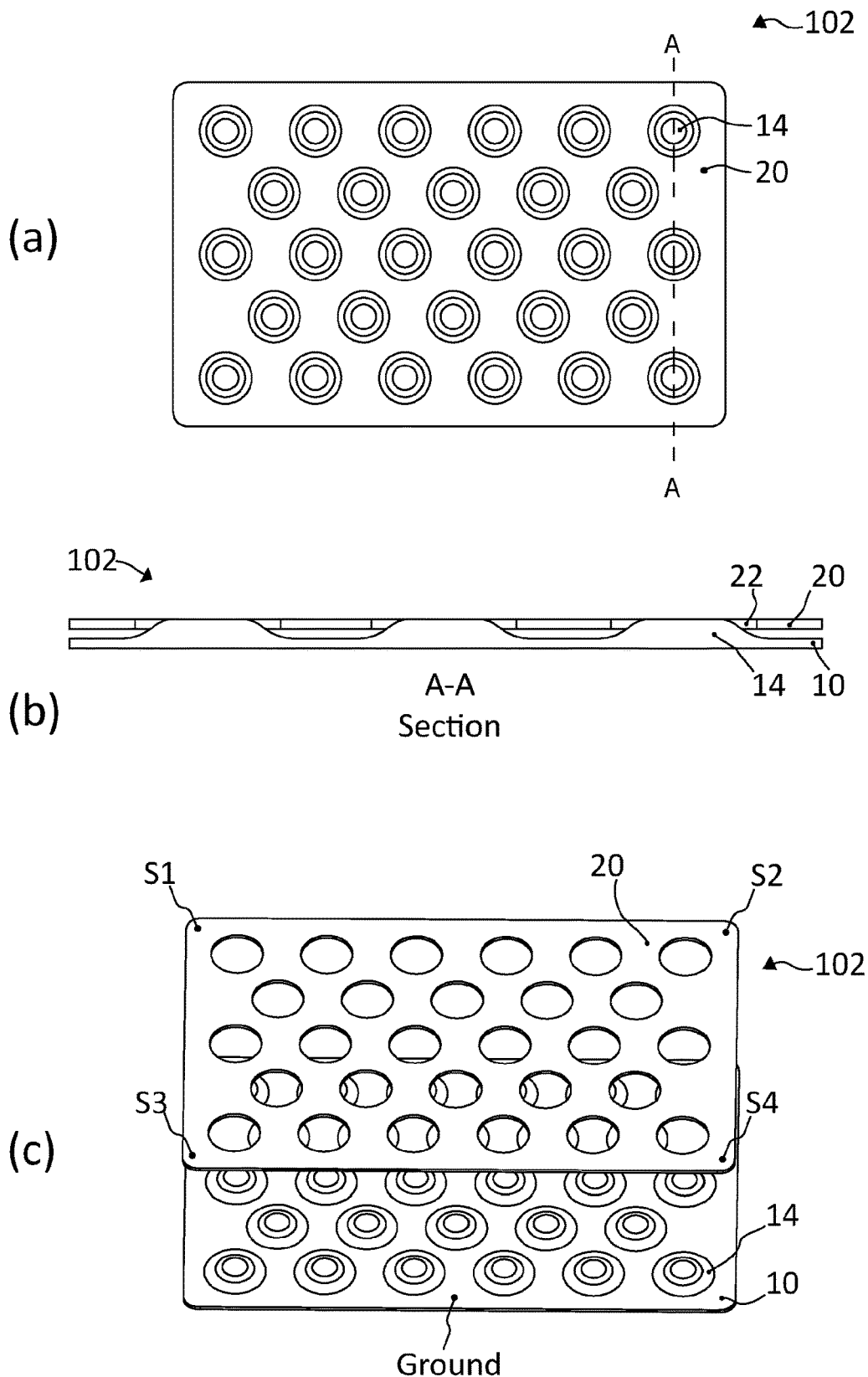
FIGS. 9a-c show, respectively, top, side and exploded views of the sensing layer of FIG. 4b according to another embodiment.

FIGS. 9a-c show an alternative embodiment of the sensing layer 102 comprising a larger array of spacers 14 and openings 22. In this example, the second electrode 20 is the sense electrode with a plurality of sensing points S1-S4 distributed around its periphery and the first electrode 20 is the reference electrode for connecting to ground (although either of the first and second electrodes 10, 20 may be used as the sense electrode).

The measurement module 500 is configured to operate in a first mode and a second mode. In the first mode, the switching unit 300 scans through each sensing point S1, S2 one by one, so that the sensing circuit 300 can obtain a measurement or reading from each individual sensing point S1, S2 separately. In the second mode, the switching unit 300 connects all sensing points S1, S2 to the sensing circuit 300, such that the sensing circuit 300 can obtain a single measurement or reading of capacitance from all sensing point S1, S2 simultaneously. In this way, each sensing point S1, S2 contributes to the measurement or reading in the second mode. In the first mode, only one sensing point S1, S2 is actively connected to the sensing circuit 300 at a given time. For example, while a measurement or reading is being taken from one sensing point S1, S2, other (non-active) sensing points S1, S2 may be disconnected from the sensing circuit. The scan frequency may be sufficiently high compared to a typical movement of the body to minimise any measurement lag, e.g. such that the measurement/detection may be perceived to be in real-time. For example, the scan rate may be in the range 100-200 Hz. The scan rate may be slower or faster depending on the application. The measurement module 500 is configured to periodically and/or continuously switch/alternate between the first and second modes of operation during operation of the device 1000. Each period provides a reading or measurement cycle C1 comprising N+1 readings, where N is the number of sensing points S1, S2. In an embodiment, the switching unit 300 is controlled by the control unit 400 and thus the first and second modes are controlled by the control unit 400.

FIGS. 10*a-c* show an example measurement cycle for a sensing layer 100, 101, 102 with two sensing points S1 and S2, where each sensing point S1, S2 is connected to the switching unit 200 that provides a single output to the input pin 320 of the sensing circuit 300. Each switching element SW1, SW2 is controllable (via the control unit 400, not shown) to switch between a closed state in which the respective sensing point S1, S2 is connected to the input pin 320, and an open state in which the respective sensing point S1, S2 is disconnected from the input pin 320. The reading cycle C1 comprises three readings, two in the first operating mode and one in the second operating mode. To generate a first reading in the first operating mode, switch SW1 is closed and switch SW2 is opened, thus capturing a reading from sensing point S1 at the input pin 320 (see FIG. 10*a*). To generate a second reading in the first operating mode, switch SW1 is opened and switch SW2 is closed, thus capturing a reading from sensing point S2 at the input pin 320 (see FIG. 10*b*). To generate a reading in the second operating mode, both switches SW1, SW2 are closed, thus capturing a reading from both sensing points S1, S2 at the input pin 320 (see FIG. 10*c*).

Readings from individual sensing points S1, S2 in the first mode and all the sensing points S1, S2 simultaneously in the second mode are used to determine a location, area and amount of the applied pressure, as is described in more detail below. The measurement cycle C1 is repeated (continuously or periodically) to monitor changes in the pressure and interaction with the sensing layer 100, 101, 102 in near-real time.

The capacitance measurement or reading from each sensing point S1, S2 is positively related to the amount of applied pressure. Due to the relatively high resistivity of the electrode material, the capacitance measurement or reading produced by a given applied pressure decays with distance (x) from the sensing point S1, S2. The reading from each individual sensing point S1, S2 is therefore related to the distance/proximity of the area/location of applied pressure from/to the sensing point S1, S2 and also the amount of applied pressure. As the geometry of the sensing layer 100, 101, 102 and the position/location of sensing points S1, S2 on the sensing layer 100, 101, 102 is known, the location and area of the applied pressure on the sensing layer 100, 101, 102 can be determined by calculating the distances of the forced location from each sensing points S1, S2, and then calculating a location and area from those distances.

Figure 10:
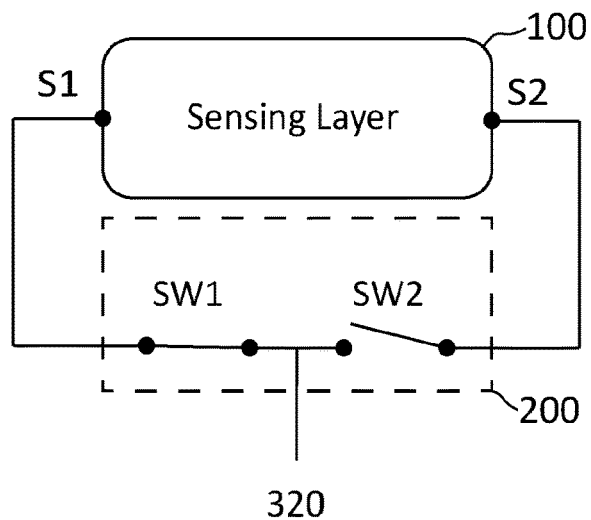
FIGS. 10a-c show different measurement configurations for the device of FIG. 1.
Figure 10:
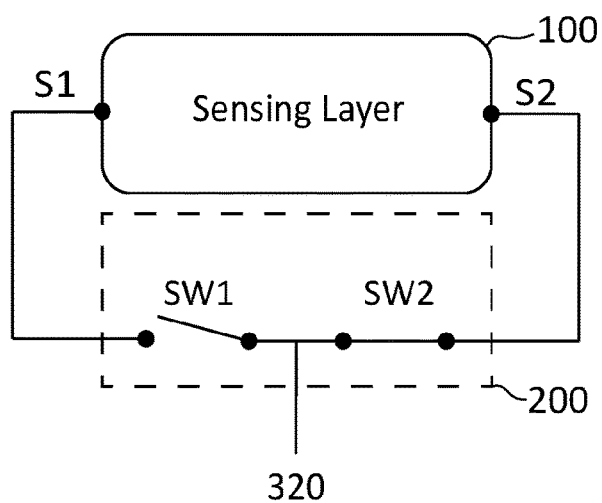
Figure 10:
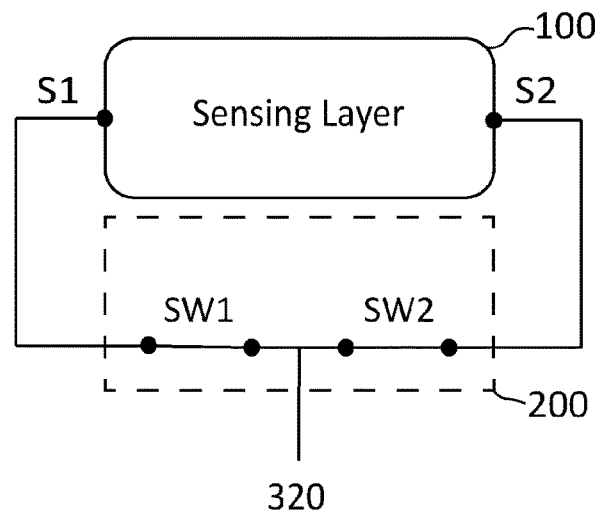

Readings from individual sensing points S1, S2 can be mapped to distances x based on a known dependence of a reading on distance x. For example, this relationship can be approximated by the exponential function $f(x)=e^{-nx}$, where e represents a constant and n is an adjustable parameter representing the decay rate, which can be determined/derived experimentally. Based on the value of the capacitance reading recorded at each sensing point S1, S2 a circle with a radius $x_1, x_2$ defined by the reading value can be defined for each sensing point S1, S2. The circles drawn from each sensing point S1, S2 outline the perimeter of the area A of the applied pressure. According, this approach can be used to re-construct the location and area A of the applied pressure (hatched area), as shown in FIG. 10. It follows that the greater the number of sensing points (circles) the greater the accuracy and spatial resolution of the pressure area mapping. However, it will be appreciated that, the sensing layer 100, 101, 102 may comprise any number N of sensing points S1, S2, . . . S$_N$, depending on the needs of the application. One or two sensing points S1, S2 provides one-dimensional (e.g. X or Y) position/area sensing, while three or more sensing points S1, S2 can provide two-dimensional (e.g. XY) position/area sensing.

Figure 11:
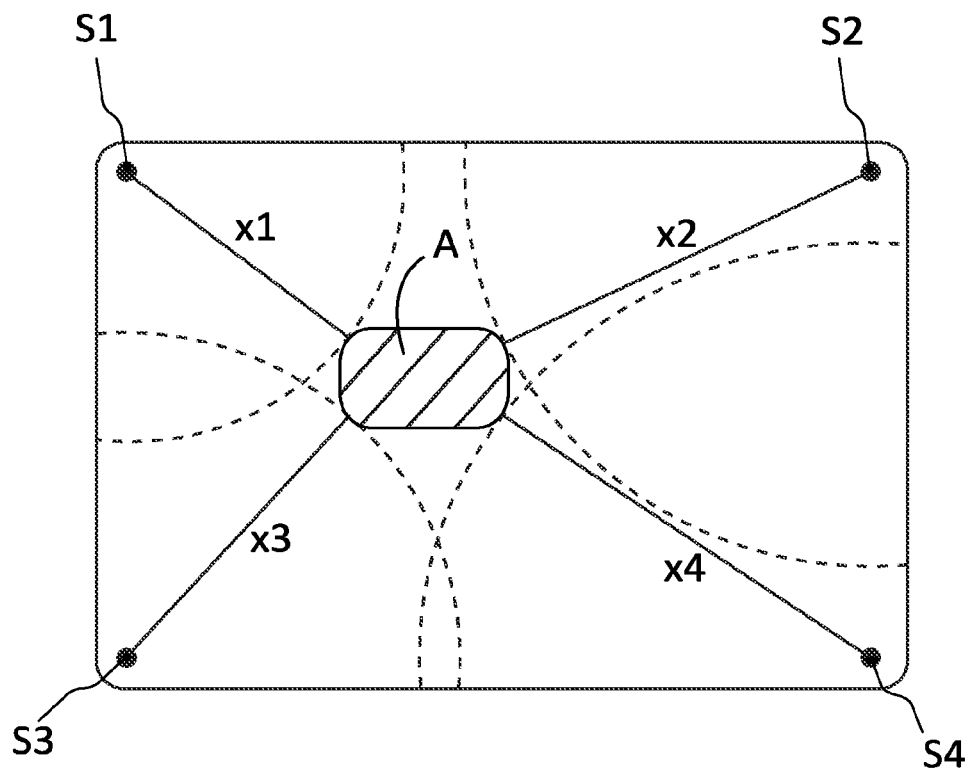
FIG. 11 shows a technique for determining a pressure area and location.

The readings obtained in the first mode of operation are used to determine the location, area and/or amount of the applied pressure. Although a rectangular area A is shown in FIG. 11, it will be appreciated that any arbitrary shaped area A may be determined using this approach. The reading obtained in the second operating mode provides information on the total pressure applied to the whole sensing layer 100, 101, 102 that can be used in conjunction with the first mode measurements to improve the accuracy/reliability of the determined location, area and/or amount of applied pressure. For example, due to the fact that the readings obtained in the first mode are dependent on both the amount of applied pressure and the distance x, the second mode reading can used to confirm whether the readings obtained in the first mode correspond to a small amount of pressure distributed over a large area, or vice versa. The two modes combined therefore provide a more reliable pressure area map.

The pressure area maps or information obtained from the device 1000 may be qualitative (i.e. providing normalised or relative values) or quantitative (i.e. where real values of pressure are required). Where quantitative data is required, the capacitance readings can be converted to a pressure value using a pre-determined relationship. For example, the device may be calibrated using known values of applied pressure.

FIGS. 12*a-f* show example reading cycles C1, C2 (see right hand side of figures) obtained from a sensing layer 100, 101, 102 with two sensing points S1, S2 subject to a pressure or force profile A, indicated by the hatched regions (see left hand side of figures). Each cycle C1, C2 comprises three readings (i.e. N+1), as described above. FIGS. 12*a* and *b* indicate the different readings obtained with, respectively, a low and high pressure/force applied to the same size area A and location on the sensing layer 100, 101, 102. FIGS. 11*c-d* indicate how the readings vary with different locations and different sized areas of applied pressure/force. In particular, FIGS. 11*d* and 11*e* show that different readings are obtained for different sized areas in the same centre location, i.e. pressure profiles. This information is used to build an accurate pressure area map of the interaction with the sensing layer 100, 101, 102, as described above.

As discussed above, the ability to resolve the spatial location and area of the applied pressure relies on the resistivity of the electrode material being relatively high. As shown in FIGS. 13*a-g*, the resistivity and/or resistance of the first electrode 10 and/or the second electrode 20 may be tuned without changing the intrinsic material properties by introducing one or more holes, hollows, cut-outs, recesses, thickness variations, and/or repeating geometric patterns/tracks to the electrode geometry. This provides a predetermined resistance between any two given points. The holes, hollows, cut-outs and/or recesses may form a regular or irregular array. The one or more holes, hollows and/or recesses may define a non-linear conduction path between any two points. Alternatively or additionally, the one or more hollows and/or recesses may define a plurality of linear and/or non-linear conduction paths between the two points.

Figure 14:
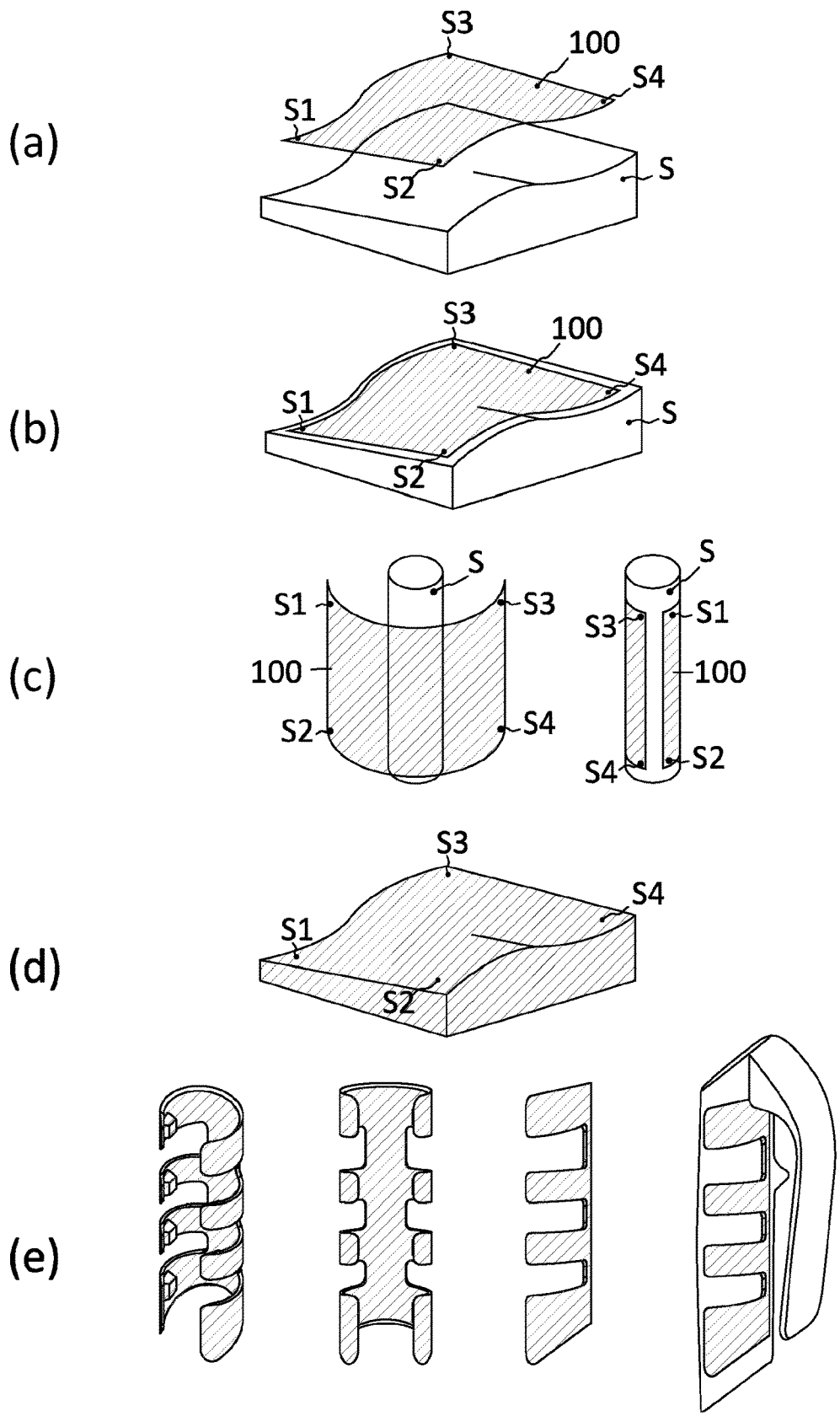
FIGS. 14 a-c show the sensing layer conforming to an arbitrary shaped surface.

The first and second electrodes 10, 20 can be produced with a number of different inexpensive materials and fabrication techniques, as described above. The first and second electrodes 10, 20 and any spacer layer 30 can be formed/moulded separately and then post-assembled together. The materials and their properties can be chosen to match the properties required by the application, e.g. shoe insoles, automobile interiors, and wearables. In addition, the first and second electrodes 10, 20 can be formed or moulded into almost any arbitrary size, shape or three-dimensional (3D) form due to the nature of the moulding process, e.g. see FIGS. 13 and 14d. For example, although FIGS. 2-9 shows the sensing layer 100, 101, 102 and electrodes 10, 20 in a substantially planar configuration, the sensing layer 100, 101, 102 and electrodes 10, 20 may be formed/moulded to conform the exterior/interior surface S of any arbitrarily shaped object, regardless of complexity, as shown in FIGS. 14a-c. The sensing layer 100 may be formed/moulded into the required shape as shown in FIGS. 14 a, b, d and e. Alternatively, where both first and second electrodes 10, 20 and any spacer layer 30 is flexible, the sensing layer 100, 101, 102 can be deformed to conform to the surface profile S. In some applications, a cylindrical configuration, as shown in FIGS. 14c and e may be utilised to provide easier mechanical connection of the sensing points S1-S4 to the measurement module 500, e.g. since the sensing points S1-S4 may be located in closer proximity compared to a substantially planar configuration.

Figure 4:
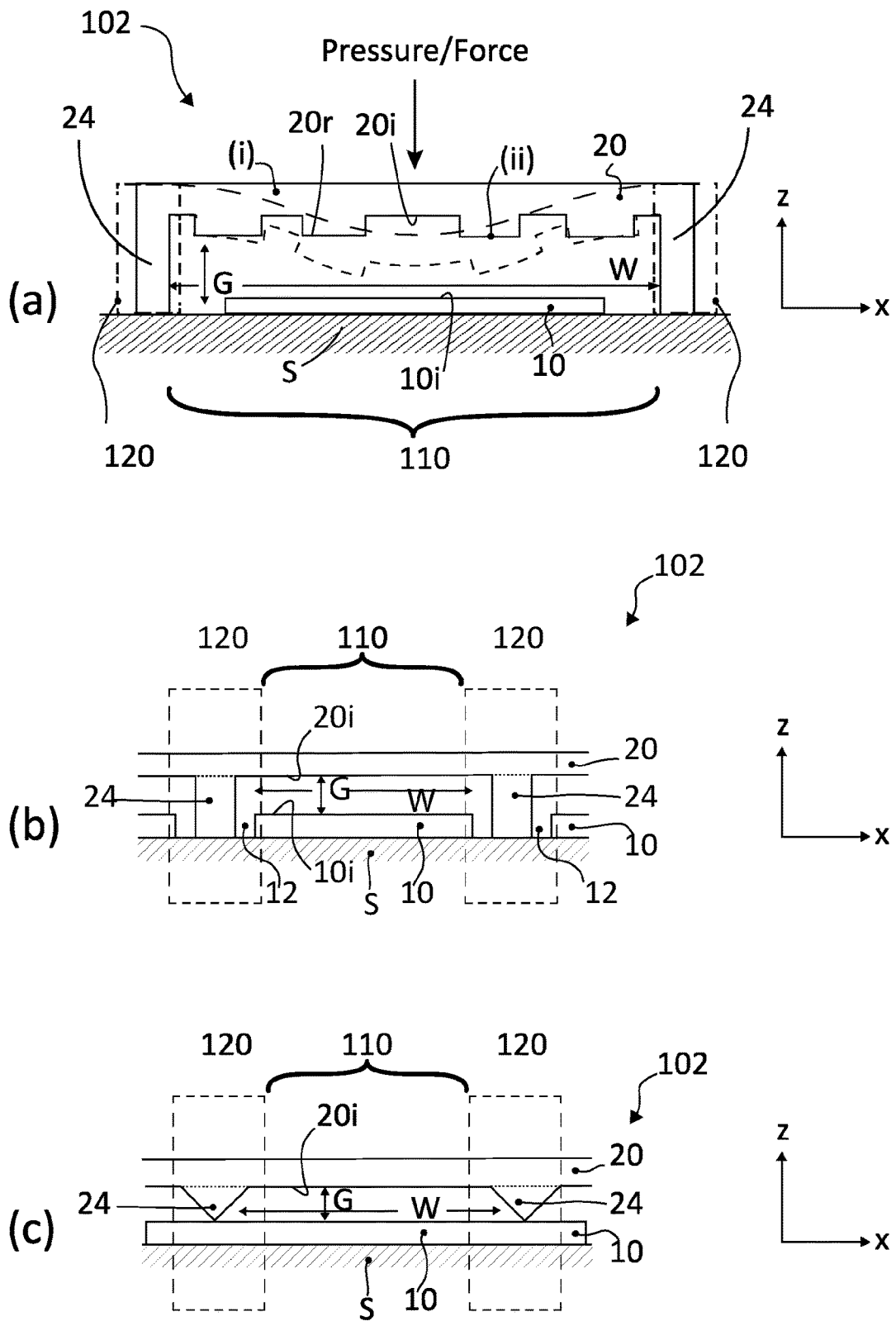
FIGS. 4a to c show schematic cross-sections of the sensing layer of the device of FIG. 1 according to further embodiments of the invention.
Figure 5:
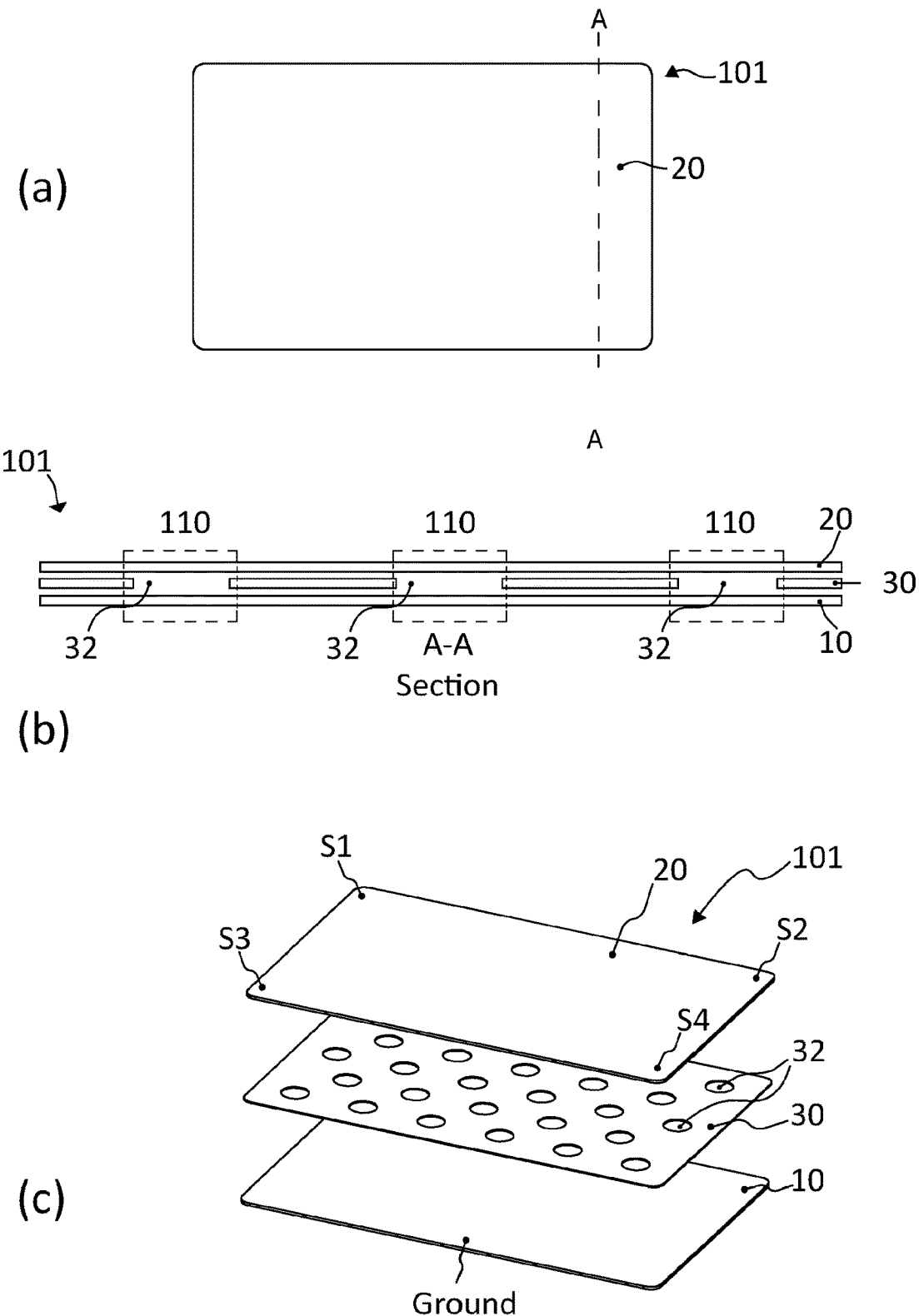
FIGS. 5 a-c show, respectively, top, side and exploded views of the sensing layer of FIG. 3 according to an embodiment.

Further, it will be appreciated that the Z direction shown in FIGS. 2, 3 and 4 is not necessarily the vertical axis, such that the sensing layer 100, 101, 102 may arranged in any orientation.

Figure 15:
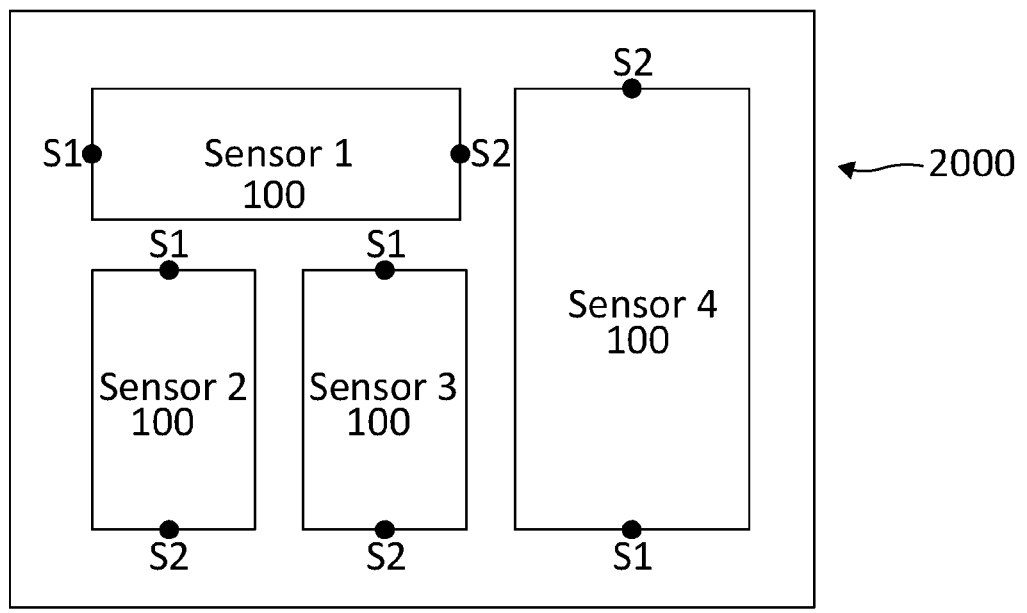
FIG. 15 shows a system comprising a plurality of devices according to FIG. 1.

FIG. 15 shows a generic system 2000 comprising multiple separate sensing layers 100 whose readings can be combined to form a single pressure area map, e.g. through a computer program or software running on the control unit 400 or a remote computing device.

Figure 16:
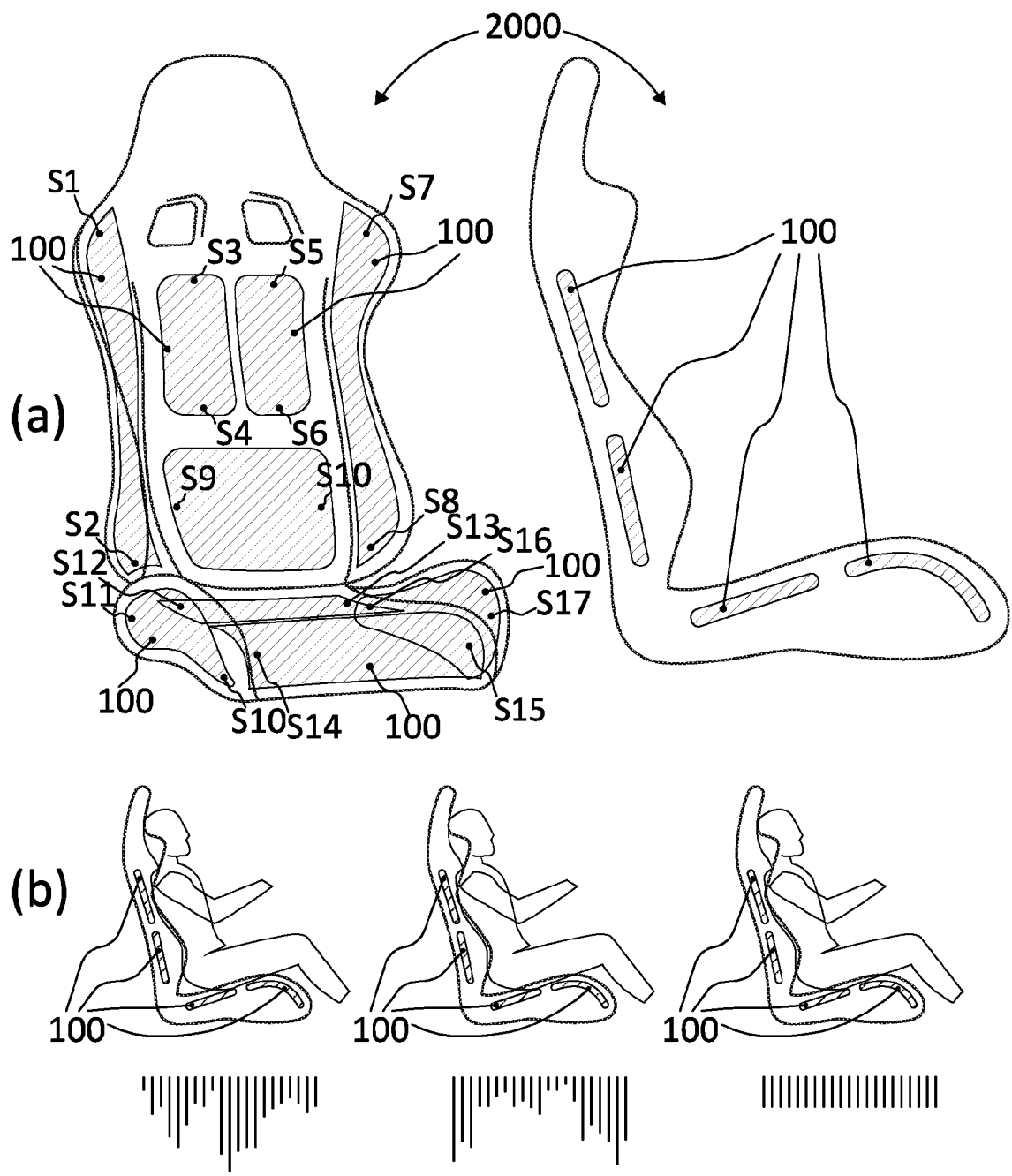

FIG. 16a shows an embodiment of the system 2000 of multiple sensing layers 100 incorporated into a seat. As with the insole device 1000 of FIG. 6 each sensing layer 100 provides information on the location, area and amount of the applied pressure or force from a specific area in the system 2000. The information from each sensing layer 100 can be combined through software to create a global pressure map of a complex sensor system 2000, effectively treating the multiple sensing layers 100 as a single large sensing layer 100 or pressure mapping area. For example, in the seat system 2000 of FIG. 16a, the multiple sensing layers 100 may be used to obtain weight distribution from which different seating behaviours can be derived, as indicated by the vertical bars in FIG. 16b. Each different sensing layer 100 of the system 2000 may connect to the same sensing input 320 of the sensing circuit 300, e.g. via one or more switching units 200. Alternatively, each different sensing layer 100 may connect to a different sensing input 320.

Figure 17:
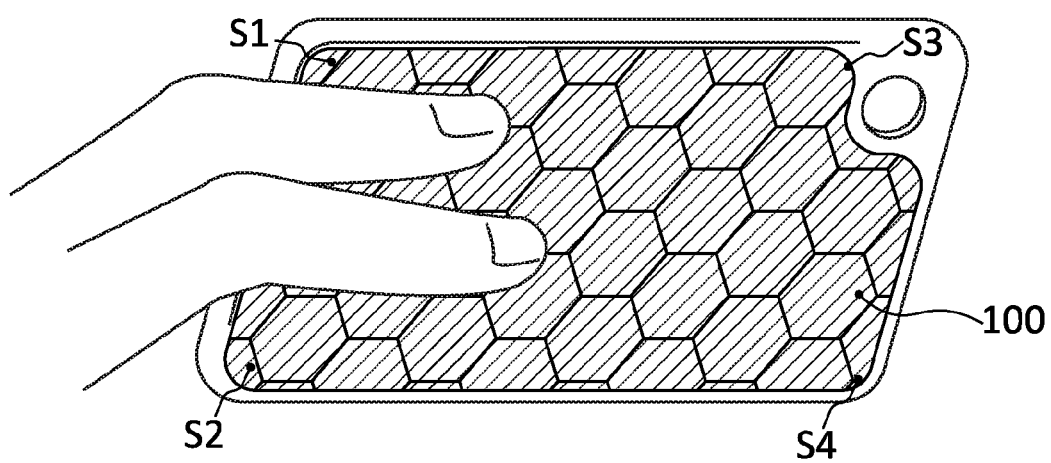
FIG. 17 shows the device of FIG. 1 incorporated into a case for a smart phone or tablet.

In addition to applications in foot and seat pressure mapping, the device 1000 may be incorporated into numerous everyday objects that users interact with. FIG. 17 shows an embodiment of the sensing layer 100 moulded and integrated in a phone case that can be used to extend the trackpad functions of a modern touchscreen phone.

Figure 18:
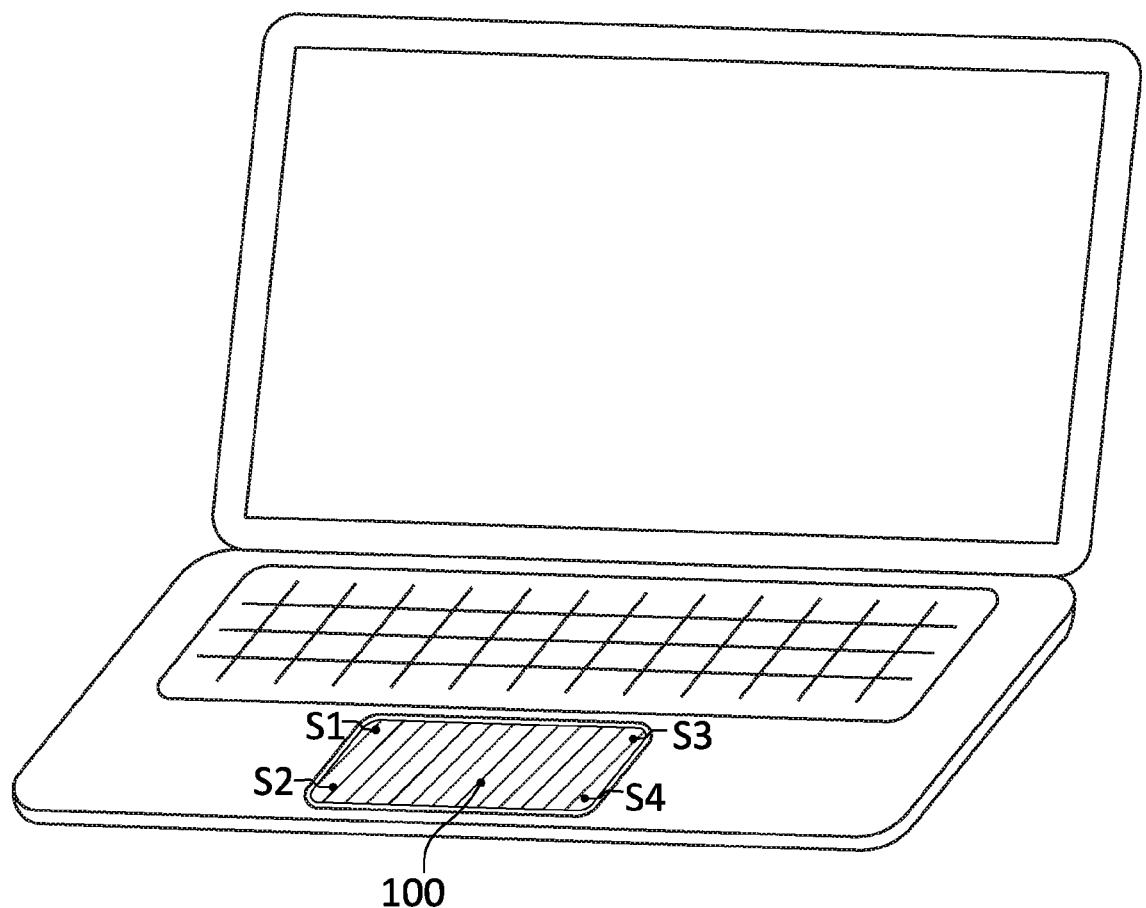
FIG. 18 shows the device of FIG. 1 incorporated into a trackpad of a computing device.

FIG. 18 shows an embodiment of the sensing layer 100 used as a laptop trackpad. The sensing layer 100 can be used to replace conventional trackpads based on touch/pressure sensor arrays with unitary non-metallic electrodes that are produced cheaply, and require fewer sensing input pins and sensing points to provide precise location information.

Figure 19:
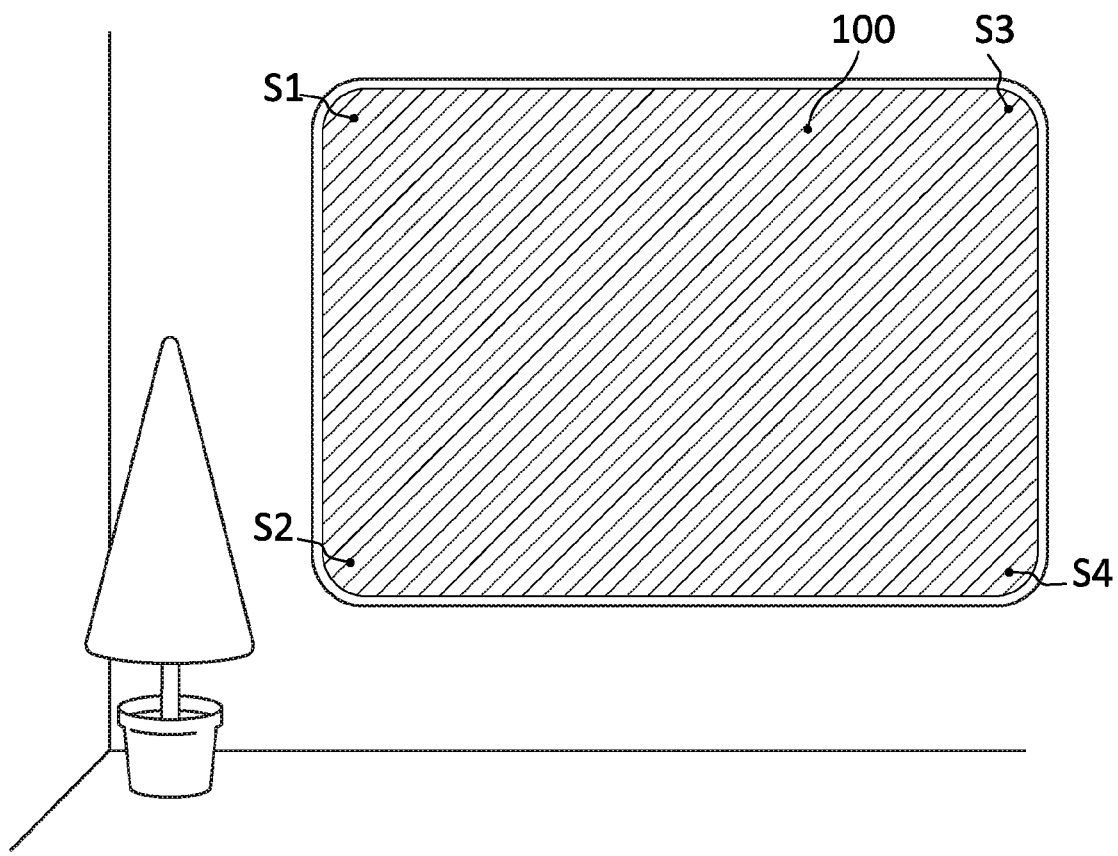
FIG. 19 shows the device of FIG. 1 incorporated into a surface of a wall.
Figure 20:
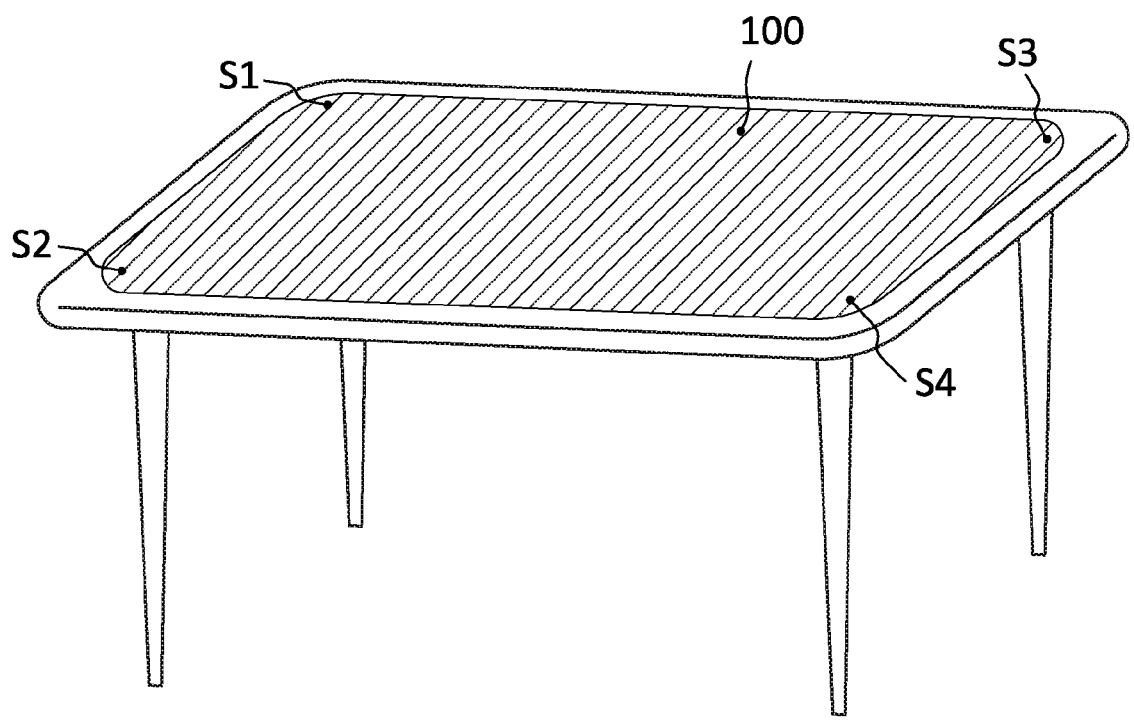
FIG. 20 shows the device of FIG. 1 incorporated into a surface of a table.

FIGS. 19 and 20 show further embodiments of the sensing layer 100 incorporated into common surfaces (e.g. a wall and table surface) to provide touch screens and/or interactive boards.

Embodiments of the invention provide a sensing layer 100, 101, 102 that produces a single capacitance reading from single sensing point S1, S2 indicative of interaction of a body/object with the sensing layer 100, 101, 102 that can be registered via a single input pin 320 of the sensing circuit 300. Adding two or more sensing points S2, S2 and switching between them can advantageously provide complementary information about the forced area and allows a more accurate location or pressure/force profile to be built-up. This is because the reading from each sensing point S1, S2 will differ based on the relative proximity/location of the applied pressure/force or localised interaction with the sensing layer 100, 101, 102 to each sensing point S1, S2.

From reading the present disclosure, other variations and modifications will be apparent to the skilled person. Such variations and modifications may involve equivalent and other features which are already known in the art, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

For the sake of completeness it is also stated that the term "comprising" does not exclude other elements or steps, the term "a" or "an" does not exclude a plurality, and any reference signs in the claims shall not be construed as limiting the scope of the claims.

The invention claimed is:

1. A pressure sensing device comprising:
   a first electrode and a second electrode being formed of or comprising a unitary piece of non-metallic conductive material, wherein the first electrode and the second electrode are spaced apart from each other by a distance, wherein the distance comprises one or more gaps, that is changeable in response to a pressure or force applied to the first and/or second electrode;
   one or more separating elements configured to separate the first and second electrodes, wherein the one or more separation elements is or comprises a non-conductive spacer layer positioned between the first and second electrodes, and wherein the spacer layer comprises one or more openings, and one or more integral projections to serve as spacers configured to separate the first and second electrodes, to provide the one or more gaps, and
   wherein the first and/or second electrodes comprises one or more openings configured to receive a portion of the one or more projections of the other of the first and/or second electrodes, such that the first and second electrodes do not contact each other; and
   wherein the one or more projections of the first and/or second electrodes contacts the other of the first and/or second electrodes, and wherein the one or more projections are configured to provide a variable contact area with the other of the first and/or second electrodes in response to a pressure or force applied to the first and/or second electrodes, and, wherein the one or more projections is substantially convex and/or pointed; and wherein each of the one or more gaps extends substantially in the region around, either side of and/or between the one or more projections; and, wherein the size of the gap is determined at least in part by the length of the one or more projections;

a measurement module connected to the first or second electrode at a plurality of sensing points on said electrode, the measurement module comprising a sensing circuit and a processor, wherein the measurement module is configured to:

measure, using the sensing circuit, a change in capacitance between the first and second electrodes, in response to a change in the distance when a pressure or force is applied to the first and/or second electrode, at each sensing point individually and at all sensing points simultaneously;

map, using the processor, each measurement obtained from an individual sensing point to a distance of the applied pressure/force from said individual sensing point; and determine, using the processor, the location, area and the amount of the applied pressure on the first and/or second electrode from the individual measurements and mapped distances, and/or the amount of the applied pressure from the simultaneous measurement.

2. The device of claim 1, wherein the first and/or second electrode is moveable and/or deformable so as to change said distance, and/or is formed of or comprises a non-metallic thermoformable conductive material, and/or is formed by a molding process.

3. The device of claim 1, wherein the sensing points are distributed around the periphery of the first or second electrode; and/or wherein the measurement module is further configured to operate in a first mode to obtain the individual measurements by scanning through each of the plurality of sensing points sequentially and in a second mode to obtain the simultaneous measurement; and, optionally or preferably, wherein the measurement module is configured to alternate between the first and second modes.

4. The device of claim 1, wherein the sensing circuit is or comprises a capacitive sensing micro-processor.

5. The device of claim 4, wherein each sensing point is connected to the sensing circuit at the same sensing input pin of the sensing circuit, or at a different sensing input pins of the sensing circuit; and/or wherein the measurement module further comprises a switching unit connected between the sensing circuit and the sensing points, wherein the switching unit is configured to selectively connect and disconnect each sensing point to/from the sensing circuit, such that a single sensing point is connected to the sensing circuit when an individual measurement is taken and all sensing points are connected to the sensing circuit when a simultaneous measurement is taken.

6. The device of claim 1, wherein the one or more separation elements is or comprises a non-conductive spacer layer positioned between the first and second electrodes.

7. The device of claim 6, wherein the spacer layer is formed of or comprises a non-conductive material; and, optionally or preferably is flexible and/or compressible, and/or is formed by a molding process.

8. The device of claim 1, wherein the spacer layer comprises an array of openings.

9. A method of operating the device of claim 1, comprising:

measuring, at a sensing circuit, a change in capacitance between the first and second electrodes, in response to a change in a distance between the first and second electrodes when a pressure or force is applied to the first and/or second electrode, at each sensing point individually and at all sensing points simultaneously;

mapping each measurement obtained from an individual sensing point to a distance of the applied pressure/force from said individual sensing point; and determining the location, area and amount of the applied pressure on the first and/or second electrodes from the individual measurements and mapped distances, and the amount of the applied pressure from the simultaneous measurement.

10. The method of claim 9, wherein the step of determining the location and area of the applied pressure on the first and/or second electrodes comprises:

mapping each measurement obtained from an individual sensing point to a distance from said individual sensing point; and determining the location and area of the applied pressure on the first and/or second electrode from the mapped distances; and/or wherein the step of measuring comprises:

selectively connecting and disconnecting each sensing point to/from the sensing circuit, such that a single sensing point is connected to the sensing circuit when an individual measurement is taken and all sensing points are connected to the sensing circuit when a simultaneous measurement is taken.

11. A method of manufacturing the pressure sensing device of claim 1, comprising:

forming the first electrode and the second electrode, wherein the first electrode and the second electrode is formed of or comprises a unitary piece of non-metallic conductive material; and connecting the measurement module to the first or second electrode at a plurality of sensing points on said electrodes;

arranging the spacer layer between the first electrode and the second electrode, wherein the step of arranging the spacer layer comprises arranging the first and second electrodes in a spaced apart configuration, such that the first and second electrodes are separated by one or more gaps, and forming an array of openings in the spacer layer, forming one or more separation elements configured to separate the first and second electrodes, wherein forming one or more separation elements comprises a thermoforming and/or a molding process, forming the non-conductive spacer layer wherein the spacer layer is flexible, forming one or more openings in the spacer layer and one or more projections integrally with the first and/or second electrodes to provide the one or more gaps, and forming an array of openings in the spacer layer.

12. The method of claim 11, wherein forming the first and second electrode comprises a thermoforming and/or a molding process and, optionally or preferably, wherein the first and/or second electrode is moveable and/or deformable.

* * * * *